United States Patent
Morby

(10) Patent No.: US 9,824,326 B2
(45) Date of Patent: Nov. 21, 2017

(54) TRACKING AN AIRBAG

(71) Applicant: David T. Morby, Liberty, UT (US)

(72) Inventor: David T. Morby, Liberty, UT (US)

( * ) Notice: Subject to any disclaimer, the term of this patent is extended or adjusted under 35 U.S.C. 154(b) by 11 days.

(21) Appl. No.: 14/186,324

(22) Filed: Feb. 21, 2014

(65) Prior Publication Data

US 2015/0242803 A1  Aug. 27, 2015

(51) Int. Cl.
*G06Q 10/00* (2012.01)
*G06Q 10/08* (2012.01)

(52) U.S. Cl.
CPC .......... *G06Q 10/087* (2013.01); *G06Q 10/20* (2013.01)

(58) Field of Classification Search
None
See application file for complete search history.

(56) References Cited

U.S. PATENT DOCUMENTS

| | | | | |
|---|---|---|---|---|
| 5,826,265 | A * | 10/1998 | Van Huben | G06F 17/30557 |
| 6,611,686 | B1 * | 8/2003 | Smith | G06Q 10/08 340/426.19 |
| 2006/0091207 | A1 * | 5/2006 | Chang | G06Q 10/087 235/385 |
| 2007/0109103 | A1 * | 5/2007 | Jedrey | G06Q 10/087 340/10.5 |
| 2008/0068170 | A1 * | 3/2008 | Ehrman | G06Q 10/08 340/572.1 |
| 2008/0307523 | A1 * | 12/2008 | Subramanyam | G06F 17/30731 726/21 |
| 2009/0222427 | A1 * | 9/2009 | Malkowicz | G06F 17/30551 |
| 2010/0066497 | A1 * | 3/2010 | Lim | G06Q 10/08 340/10.1 |
| 2010/0274816 | A1 * | 10/2010 | Guzik | G11B 27/034 707/802 |
| 2010/0310194 | A1 * | 12/2010 | Archambault | A45C 11/22 383/42 |
| 2012/0150552 | A1 * | 6/2012 | Belady | G06Q 10/30 705/1.1 |

* cited by examiner

*Primary Examiner* — Fateh M Obaid
(74) *Attorney, Agent, or Firm* — Fabian VanCott; Jeffrey K. Riddle

(57) ABSTRACT

A system of tracking an airbag, comprising a server, a parts database communicatively coupled to the server, and a number of user devices communicatively coupled to the server in which the server collects data associated with the airbag and in which the system receives and updates status data associated with the airbag. A method of tracking an airbag, comprising collecting data associated with a specific airbag, storing the collected data on a parts database, receiving updated airbag status data, and providing the collected data and status data to a user.

22 Claims, 11 Drawing Sheets

TRACKING AN AIRBAG

BACKGROUND

Airbags provide valuable lifesaving capabilities to a vehicle. In cases where a collision in a vehicle would cause head trauma to the driver, an airbag can significantly, if not completely, reduce the external and internal injuries to a driver. The development of these airbag devices have increased to include a number of different types of airbags in a single car including driver-side airbags, passenger-side airbags, side-seat airbags, and a number of curtain airbags.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
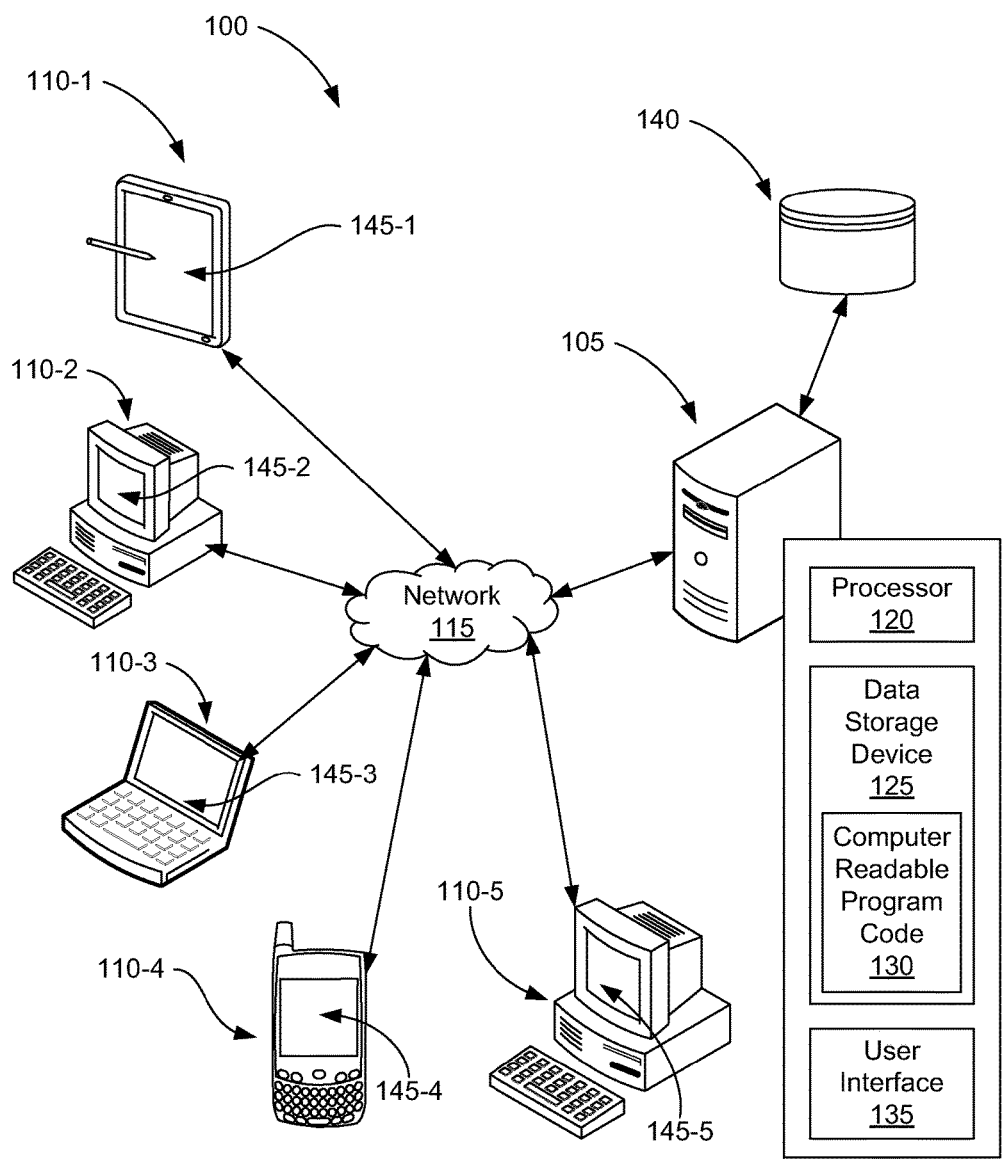
FIG. 1 is a block diagram of a system for tracking an airbag according to one example of principles described herein.

As briefly noted above, any single vehicle may have any number of airbags installed to prevent significant injuries to a number of occupants of the vehicle. However, when a crash does occur, the airbags may be subjected to stricter scrutiny by a number of parties associated with the vehicle. Some of these interested parties may include the owner of the vehicle, a potential purchaser of the vehicle, an insurer of the vehicle, a manufacturer of the vehicle, a vehicle repairman, a car dealership, law enforcement officials, airbag and auto parts recyclers, and the original manufacturer of the airbags installed in the vehicle.

For example, a dealership or vehicle manufacturer may be interested in replacing a number of airbags in a vehicle. Replacement of these airbags may be in the form of a product recall and may be initiated by the vehicle manufacturer or dealership on behalf of the manufacturer. The product recall of the airbags may be the result of a discovered product defect or safety issue associated with the airbag. Where such a product recall exists, it may be beneficial for the dealership or manufacturer to know which vehicles comprise the recalled airbags, which of the vehicles have been subjected to the recall, and where or whether the recalled bags are destroyed. The present system and method may provide such entities with the ability to track any airbag subject to a recall.

Additionally, the owner of a vehicle may wish to have, for example, a deployed airbag replaced. After a crash, for example, the owner of the vehicle can see that the deployed bags have now served their purpose and are to be removed and replaced. However, the owner may not realize that any undeployed airbags may, in fact, be defective. These airbags may also need to be replaced. The present system and method may provide an owner with additional knowledge about the airbags in his vehicle as well as advice/instructions from an insurance provider on what must happen with all of the airbags in the vehicle.

A similar concern may arise for the insurer of the vehicle as well. In some instances, the insurance company that is insuring the vehicle may wish to notify the owner that both the deployed and undeployed airbags will have to be replaced before a certain level of insurance is guaranteed by the insurer. In some instances, insurance may not be provided to the owner of the vehicle until the vehicle is repaired with all installed airbags replaced. Knowledge of what type and which airbags are present in the vehicle may better inform the insurance company of how best to insure the owner of the vehicle. The present system and method may also provide the insurance provider with safeguards to protect the owner of the vehicle from potential harm due to inappropriately installed airbags. Still further, the present system and method may provide the insurer with the ability to document when the repairs were not made thereby shielding them from potential insurance claims should the vehicle be involved in another collision.

It may be convenient for an insurance company to be able to check on which airbags are replaced by a repairman in a shop. Specifically, it may be in the best interest for an insurance company to prevent fraud by monitoring if any and what types of airbags are being replaced in a vehicle. If a vehicle repairman incorrectly or maliciously installs a known defective airbag and a person is injured in an accident because of that installation, the insurance company may be required to pay more to cover the damages than otherwise should be paid. Using the system and method described here, the insurance company may be provided with additional documentation suggesting that the correct airbag was not installed or that the repairman had somehow committed fraud. The additional information may be provided to the insurance company when, for example, a defective, deployed, or recalled airbag is being used to replace an airbag in a vehicle the insurance company is currently insuring, an agent within the insurance company may receive an email, text, phone call or other notification that the bad has been scanned. The information may further include the location where the bad is being replaced at as well as the VIN of the vehicle. Additionally, a user of the one of the number of user devices (110-1 through 110-5) attempting to input information regarding the association of a defective, deployed, or recalled airbag to a specific vehicle, the system will alert the user of the nature of the airbag and will further provide information as to why the replacement of an airbag with the defective, deployed, or recalled airbag is inappropriate.

To the manufacturer of the airbag, the information retrieved by the present system and method provides them with information concerning the effectiveness of their airbags. Additionally, information may also be provided documentation to the manufacturer regarding the installation and use of the airbag throughout the lifetime of the airbag.

During the manufacturing process, the manufacturer of the airbag may use the present system and method to document the particulars of the airbag. In some examples described herein, the "creation" date of the airbag may be generated and the new airbag may be made available to consumers such as vehicle manufacturers or after market purchasers.

Law enforcement agencies also have an interest in reducing occurrences of fraud in the community. The present system and method may allow investigators the ability to scan the identification code of any airbag to retrieve its particular information and history. This may be done to determine if the bag had been sold on the black market or if someone associated with the history of the airbag has attempted or has committed fraud.

A recycler of airbags may also benefit from the below described system and method. An airbag recycler may be paid by the number of airbags reported as being destroyed. This may benefit a number of entities such as the airbag manufacturer, the insurance company, and the vehicle manufacturer. Each of these entities may pay an additional amount of money to know that each defective or deployed airbag has been destroyed. With this knowledge, each of these entities may be further assured that, due to their relationship with the vehicle, they will not be subject to potential litigation should those airbags remain in commerce or in the vehicle.

It may be also be convenient for a number of these entities mentioned above to be able to monitor which family of airbags is related to any given vehicle. Where any single vehicle comprises any number of airbags those airbags have a familiar relationship amongst each of them. Additionally, where any single vehicle comprises any number of airbags, any single airbag can be traced from the manufacture of the airbag to the car manufacturer, through a body shop and to a disposal site. This provides information to all participants as to the location and the entire life history of the airbag thereby providing to the OEM, and potentially others involved, a confirmation that any specific airbag has been marked as defective or deployed and thus sent to be destroyed. In addition, it would be beneficial to those involved to have confirmation that any specific airbag has been destroyed and thereby taken out of the stream of commerce. This may additionally have the benefit of preventing the sale and consumption of black-market airbags.

The present application therefore describes a system of tracking an airbag, comprising a server, a parts database communicatively coupled to the server, and a number of user devices communicatively coupled to the server in which the server collects data associated with the airbag and in which the system receives and updates status data associated with the airbag.

The present application further describes a method of tracking an airbag, comprising collecting data associated with a specific airbag, storing the collected data on a parts database, receiving updated airbag status data, and providing the collected data and status data to a user.

Still further, the present specification describes a computer program product for tracking an airbag, the computer program product comprising a computer readable storage medium comprising computer usable program code embodied therewith, the computer usable program code comprising computer usable program code to, when executed by a processor, collect data associated with a specific airbag; computer usable program code to, when executed by a processor, store the collected data on a parts database; computer usable program code to, when executed by a processor, receive updated airbag status data; and computer usable program code to, when executed by a processor, provide the collected data and status data to a user.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

In the present specification and in the appended claims, the term "user" is meant to be understood broadly as any person or entity engage with the creation, selling, installation, or destruction of a commodity. In one example presented in the present specification the actor may be a manufacturer, installer, seller, consumer, or destroyer of airbags. Throughout the description an example of a user may include a dealer, a body shop owner or repairman, a law enforcement officer, an insurance agent or entity, a member of the public, a recycler of airbags, a packager of airbags, an original equipment manufacturer, or a supplier of originally manufactured equipment, among others.

Additionally, in the present specification and in the appended claims, the term "collected data" is meant to be understood broadly as data associated with the characteristics of an airbag. In one example, the collected data may comprise the family of airbags the particular airbag belongs to, the vehicle the airbag is installed in, the manufacturing date of the airbag, the barcode associated with the airbag, the serial number associated with the airbag, the manufacturer of the airbag, the manufacturing date of the airbag, and the destruction date of the airbag, among others. In another example, the collected data does not include the status of the airbag.

Further, in the present specification and in the appended claims, the term "status data" is meant to be understood broadly as data associated with the status of an airbag. In one example the status data may comprise a "packaged" status, a "delivered" status, an "installed" status, a "damaged" status, a "deployed" status, and a "destroyed" status, among others.

Still further, as used in the present specification and in the appended claims, the term "a number of" or similar language is meant to be understood broadly as any positive number comprising 1 to infinity; zero not being a number, but the absence of a number.

Even further, as used in the present specification and in the appended claims, the term "network" is meant to be understood broadly as any system of resources such as appliances, computer, and storage devices, that are connected virtually or physically. In one example, a network may be at least two computers communicatively coupled together. In another example, a network may comprise a larger number of computing devices and may be operated over the Internet.

Turning now to FIG. 1, a system (100) for tracking an airbag is shown. The system (100) may include a server (105) communicatively coupled to a number of user devices (110-1 through 110-5). The server (105) may be communicatively coupled to the number of user devices (110-1 through 110-5) through a network (115). The network (115) may comprise a wired or wireless connection between two or more computing devices and may therefore comprise a LAN line, a WAN line, a Bluetooth connection, and a wireless internet connection, among others. Additionally, the network (115) may be implemented over an internet, the world-wide web, an intranet or the Internet. In one example, the individual number of user devices (110-1 through 110-5) may use an internet connection to gain access to the server (105).

The server (105) may be a computing device comprising a processor (120), a data storage device (125), and a user interface (135). The data storage device (125) stores data such as executable computer readable program code (130) that is executed by the processor (120) or other processing device. As will be discussed, the data storage device (125) may specifically store a number of applications that the processor (120) executes to implement at least the functionality described herein. The server (105) may be accessed by the number of user devices (110-1 through 110-5) using a web hosting service that allows a number of users to make access a website associated with the server in order to access the services provided therein. In another example, the services provided by the server (105) and parts database (140) may be implemented on a cloud network.

The data storage device (125) may include various types of memory modules, including volatile and nonvolatile memory. For example, the data storage device (125) of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device (125) as may suit a particular application of the principles described herein. In certain examples, different types of memory in the data storage device (125) may be used for different data storage needs. For example, in certain examples the processor (120) may boot from Read Only Memory (ROM), maintain nonvolatile storage in the Hard Disk Drive (HDD) memory, and execute program code stored in Random Access Memory (RAM).

Generally, the data storage device (125) may comprise a computer readable storage medium. For example, the data storage device (125) may be, but not limited to, an apparatus, system, or device implementing electronic, magnetic, optical, electromagnetic, infrared, or semiconductor mechanisms or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The server user interface (135) may be any device or computer readable program code capable of allow a user to interact with the server (105). Specifically the user interface (135) may include a keyboard, a screen, a mouse or any other hardware that allows a user to interact with the executed computer readable program code (130) described to accomplish the methods described herein. The user interface (135) may further comprise computer readable program code (130) that, when executed by the processor (120), provides an interactive graphical user interface with which the user may enter data and cause data to be received. In this example, the services provided to each user of the system (100) may be implemented over a cloud computing system and/or web-based hosted platform that uses a distributed computing system over the network (115) such that the program may be ran on a number of connected computers.

The server (105) may also be communicatively coupled to a parts database (140). The parts database (140) may include data regarding various parts and items associated with the system. The parts database (140) may be a relational database management system (RDBMS) such as MySQL®, SQL server, or Oracle database developed by Oracle Corporation. The parts database (140) may therefore be accessed by the server (105) and may provide multi-user access to a number of databases.

In the example presented in the present specification, the parts database (140) may include a listing of all manufactured airbags as well as metadata associated with those airbags. In this example, the metadata may include an associated serial number of the airbag, a manufacturing date, a vehicle identification number (VIN) associated with the airbag, the date the airbag was installed in the vehicle associate with the VIN, removal date, any associated airbags installed in the same vehicle that the present airbag is also installed in, destruction date, the internet protocol (IP) address associated of the user device (110-1 through 110-5) used to updated or alter the metadata, location (i.e. global positioning satellite (GPS) information) of any of the previous transactions or actions completed with a user device (110-1 through 110-5), and any actors associated with any of the previous transactions or actions, among others. This information associated with each airbag may be used the present system and method described herein to track each airbag from when it was manufactured to when it is destroyed. In one example, the system may treat a group of airbags as a family of airbags. The family of airbags may comprise all airbags that belong to one specific vehicle. Thus all airbags are not only associated with a vehicle, but also have a familiar relationship with each other airbag in that vehicle. As one of the number of airbags in the family of airbags is replaced, the metadata may be changed for each airbag in the family. The replacement airbag is associated with the VIN of the vehicle as well as with each airbag identification number associated with each of the other airbags in that vehicle. Each of the other airbags metadata may also be updated and associated with the replacement airbag identification number. Still further, the association of each of the other airbags with the replaced airbag is now severed indicating that the replaced airbag is no longer part of the airbag family.

Thus the present system and method may provide to a number of different types of users with information regarding each airbag installed in a vehicle. Although the present specification describes the system and method in terms of tracking a number of airbags, this example is not meant to be limiting and other types of goods may be tracked using the described system and method. The goods may include any good that any person or entity (manufacturer, consumer, insurance agency, etc.) may wish to track the use of in order to avoid liability associated with that good or save operational costs.

In order to allow a number of users to gain access to the data contained on the parts database (140), a number of user computing devices (110-1 through 110-5) may be communicatively coupled to the server (105). As described above, the user computing devices (110-1 through 110-5) may be communicatively coupled to the server (105) via, for example, an internet connection. The user computing devices (110-1 through 110-5) may be any type of computing device including a computer tablet (110-1), a desktop computing device (110-2, 110-5), a laptop computing device (110-3), a personal digital assistant or smartphone (110-4), among others. Each of these user computing devices (110-1 through 110-5) may comprise a processor and a data storage device similar to the server (105) described above. In one example, the user computing devices (110-1 through 110-5) may further comprise a barcode scanner, a camera, or any other information capture device such that a VIN on a specific vehicle or an airbag barcode may be input into the user computing device (110-1 through 110-5) and used by the system as described herein. The user computing devices (110-1 through 110-5) may be used by a number of different types of users and may provide each user with a level of access to the parts database (140) to fit a particular objective. Each of the user computing devices (110-1 through 110-5) may also provide to the user a user device interface (145-1, 145-2, 145-3, 145-4, 145-5) including a graphical user interface such that they may interact with the computer readable program code (130) as described above in order to gain access to and interact with that data on the parts database (140).

Figure 2:
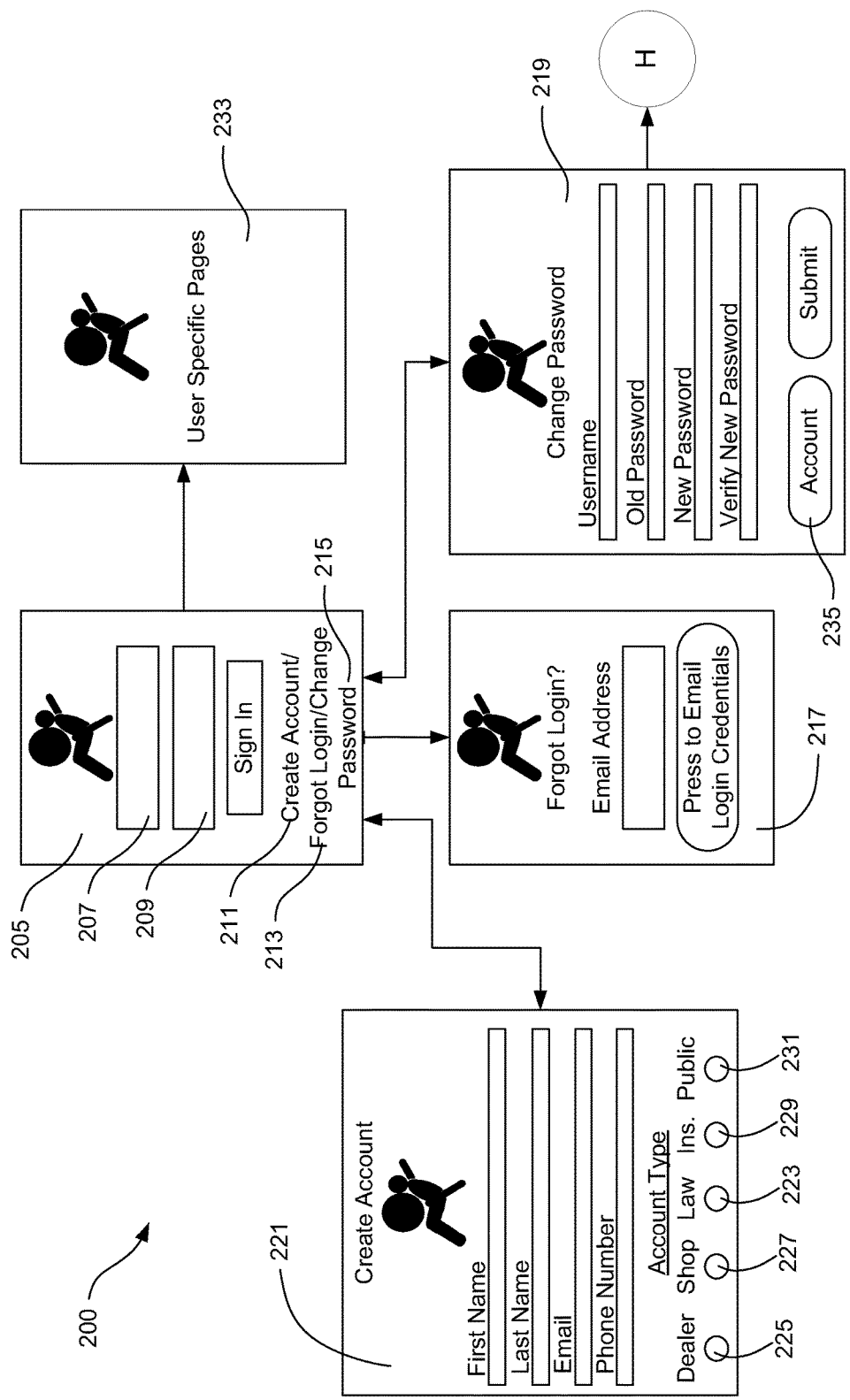
FIG. 2 is a diagram showing a number of graphical user interface pages presented to a user of the system according to one examples of the principles described herein.

FIG. 2 is a diagram showing a number of graphical user interface pages presented to a user of the system (FIG. 1, 100) according to one example of the principles described herein. In the present specification and in the appended claims, the term "page" is meant to be understood broadly as a display image generated by the GUI that provides fields and controls that help users accomplish tasks. In one example, these pages may be linked in such a way as to lead a user to the information or activities he or she is intending to engage in. Additionally, they may provide any suitable data entry tools such as text boxes, slider bars, check boxes, buttons, barcode scanner interfaces and/or other suitable textual and/or graphical data entry tools that allow a user to adjust or select options on the pages. The pages (200) shown in FIG. 2 represent an initial login page (205). The initial login page (205) may provide a user of the system (FIG. 1, 100) with the ability to enter in a username (207) and a password (209) in order to gain secure access to the system (FIG. 1, 100) and specifically the data in the parts database (140). A user who has registered with the system (FIG. 1, 100) may type in their respective username (207) and password (209) and receive access to the data. However, a user who has not received or who has forgot such login information may select one of either the create account link (211) or forgot login link (213). Additionally, for added security and customization of the system (FIG. 1, 100), a change password link (215) may also be presented on the login page (205) in order to provide the user with the ability to change the password.

The forgot login link (213) may direct a user to a forgot login page (217) where the user may enter in a valid email address and have his or her login information emailed to him or her securely. The user may then enter in this information on the login page (205) and gain access to the system (FIG. 1, 100). A user may also choose to select the change password link (215) and be directed to a change password page (219) where the user may provide information to the system (FIG. 1, 100) sufficient to identify the user and a new password the user is intending to use to gain access to the system (FIG. 1, 100).

The user may also choose to create an account by selecting the create account link (211). The create account link (211) may be provided to a user when the user's access to the system (FIG. 1, 100) is the initial access. When selected, the user is brought to a create account page (221) where the user may be directed to enter in personal information such as a name, address, email, phone number, and credit card information, among others. This information may be stored, for example, by the system (FIG. 1, 100) on the server (FIG. 1, 105). In addition to the personal information presented on the create account page (221), the user may also be asked to indicate the activities the user is engaged in by noting what profession or area they work in. For example, the user may indicate that they are a member of law enforcement in a certain area and may indicate so by selecting a law radial button (223). In addition to presenting this option to the user, the system (FIG. 1, 100) may request additional credentials from the user indicating that, in this example, the user is indeed a law enforcement officer. These credentials may include a social security number or an identification number (i.e., a law enforcement identification number, etc.). The additional credentials may provide a level of security in the system (FIG. 1, 100) as well as direct the user to pages in the GUI more relevant to his or her tasks according to the methods described herein. The system (FIG. 1, 100) may further store this information such that the user will be treated as, for example, a law enforcement user and will also be directed to the appropriate pages once the user has logged into the system (FIG. 1, 100). Although FIG. 2 shows a "dealer," (225) "shop," (227) "law," (223) "insurance," (229) and "public" (231) radial button, more radial buttons may be provided so as to accommodate a number of other types of users. Additionally, the present specification contemplates that these terms may be adjusted such that a user may better define the type of profession he or she is engaged in. In the present example, however, each radial button is meant to be actuated by a certain type of person. For example, the "dealer" (225) radial button is meant to be actuated by a person engaged in selling vehicles such as at a dealership. Additionally, the "shop" (227) radial button is meant to be actuated by a person engaged in repairing vehicles. Further, the "law" (223) radial button is meant to be actuated by a person engaged in law enforcement. Still further, the "insurance" (229) radial button is meant to be actuated by a person engaged in evaluating damage or adjusting insurance coverage on a vehicle. Even further, the "public" (231) radial button is meant to be actuated by those users who do not fit into any of the above categories and may be a member of the public.

The actuation of these radial buttons (223, 225, 227, 229, 231) will direct a user to a specific number or series of pages generated specifically for that type of person. Therefore, a user who is engaged in law enforcement may not wish to actuate the "public" (231) radial button because the pages presented to that user may not be applicable to that user. However, the user may also be provided with a link on any page that will allow them to change this setting.

Once the user has entered in the appropriate information and has provided the system (FIG. 1, 100) with the correct username (207) and password (209) the user may be directed to his or her user specific pages (233) based on the information provided in the "Create Account" page (221). The following figures represent a number of series of pages that may be presented to a number of different types of users based on the radial button (223, 225, 227, 229, 231) selected by the user. The following examples, however, are merely meant to be examples and are not intended to be limiting in any way. Instead, the pages and series of pages presented are meant to be used as a method by which a user can access the information regarding any number of goods (i.e. airbags) and address their current condition.

Figure 11:
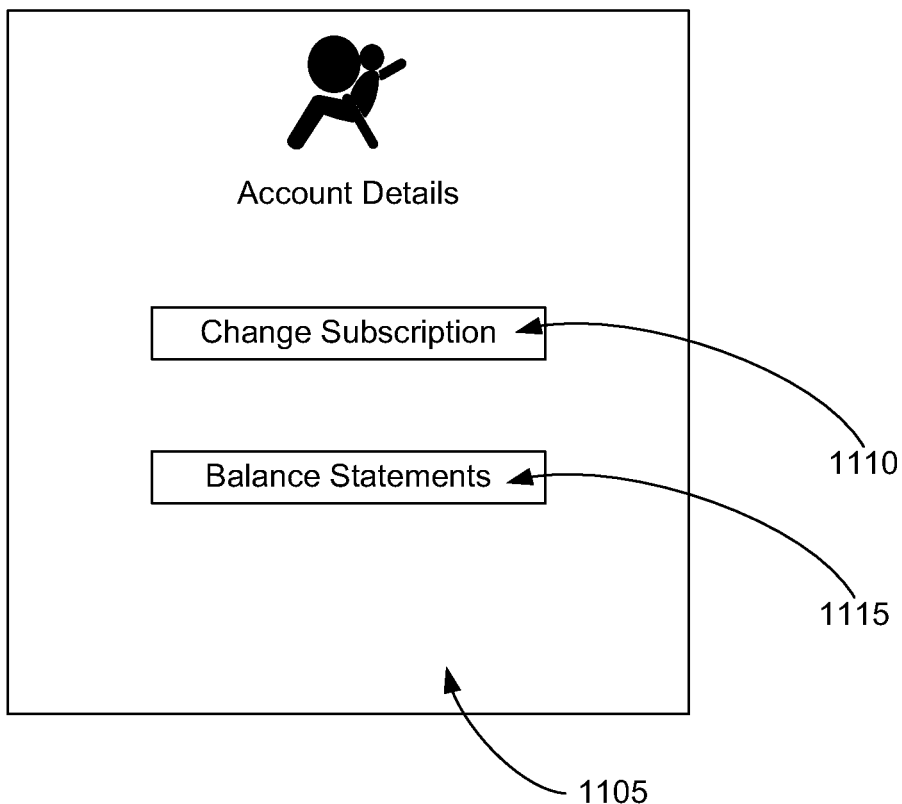
FIG. 11 is a diagram showing an account details page presented to a user of the system according to one example of the principles described herein.

FIG. 2 further comprises an account button (235). Actuation of the account button (235) may lead the user to an account details page (FIG. 11, 1105). The account details page (FIG. 11, 1105) may provide a user with specifics of his or her account. This page will be described in more detail below.

Figure 3:
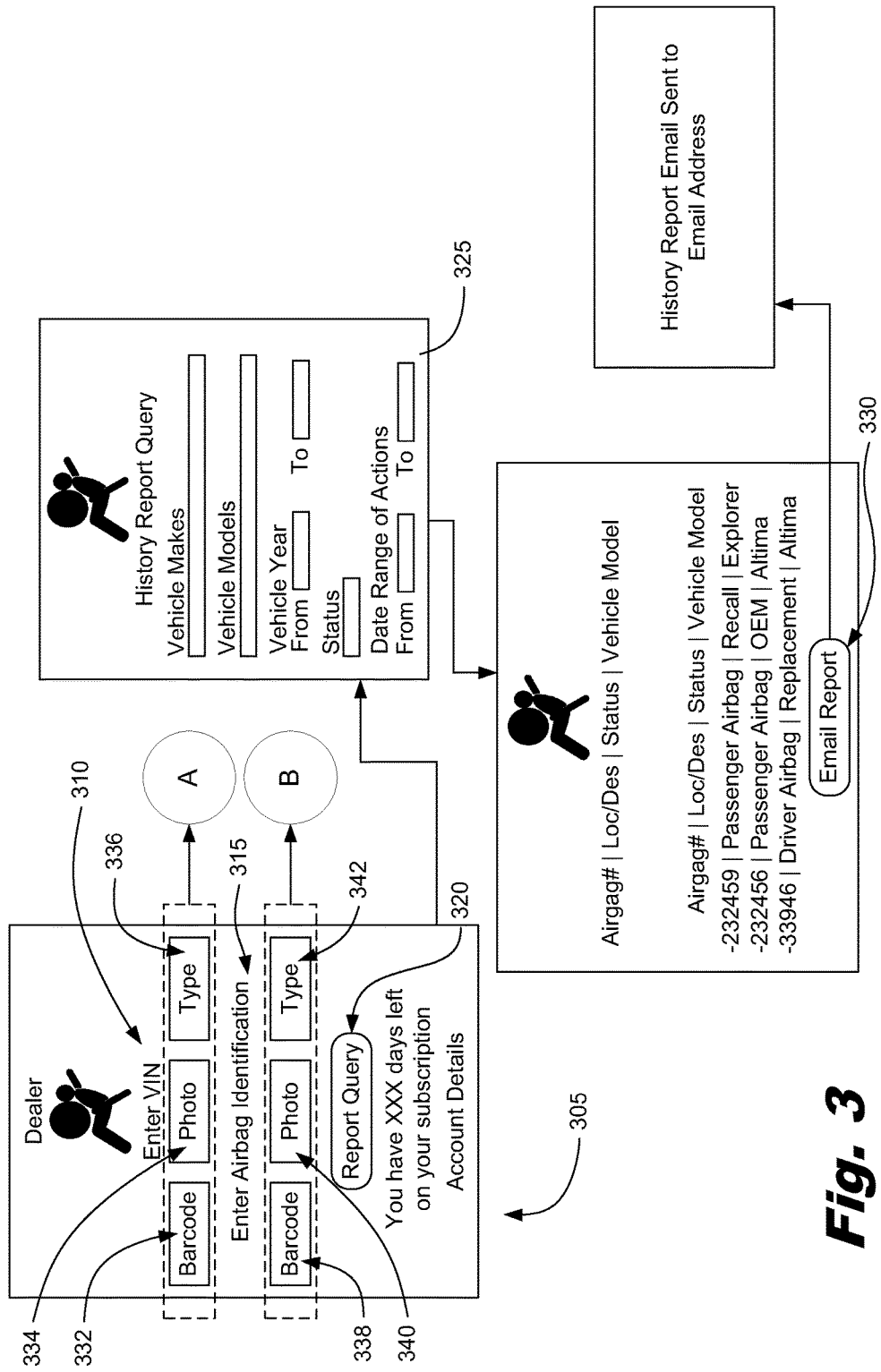
FIGS. 3-9 is a diagram showing a number of graphical user interface pages presented to a user of the system such as a dealer according to one example of the principles described herein.

FIG. 3 is a diagram showing a number of graphical user interface pages presented to a user of the system such as a dealer according to one example of the principles described herein. As briefly described above, a dealer may wish to know what airbags are present in a specific vehicle. In one example, the dealer may access the information regarding the currently installed airbags such that they will be informed as to whether or not any specific airbag has been replaced under a recall procedure initiated by the original airbag manufacturer or the manufacturer of the vehicle. Additionally, if the dealer is a used car salesman, for example, he or she may use the system (FIG. 1, 100) to access data as to whether the current airbags installed are black-market airbags. This knowledge may allow the dealer to better determine whether the car should be sold or the airbags replaced such that the dealer will not be subject to any litigation should the airbags not work in the event of an accident.

In order to accomplish these goals, the dealer may sign up or otherwise access the system (FIG. 1, 100) as described in connection with FIG. 2. In doing so, the dealer may be directed to a dealer user page (305). The dealer user page (305) may comprise a number of options for the dealer to select in order to find general information about makes and models of vehicles and their associated airbags or specific information about a certain vehicle. The dealer user page (305) comprises a number of enter VIN vehicle identification options (310), a number of enter airbag identification (315) options, and a report query (320) selection option.

FIG. 3 shows a number of pages that may be shown to a user upon selecting the report query (320) selection option. When a dealer selects this option, the dealer is directed to a history report query page (325). The history report query page provides fields into which the dealer may enter in the make, model, year, status, and actions of any type of vehicle. In this case, the dealer may be as specific or general as to the amount and type of data input on this screen to fit a particular objective. For example, if the dealer would like to know the status of all airbags installed in Ford® vehicles, the dealer may select from a pull down menu or input the term "Ford" into the vehicle makes field and submit the query. In this example, the dealer will be provided with a list of all vehicles made by Ford® as well as all of the types of airbags installed in those vehicles and their status. As used in the present specification and in the appended claims, the term "status" may be broadly interpreted as the state of any single airbag installed in a vehicle. In this example, the dealer may see that all passenger airbags in all Ford® Explorers® have been subjected to a recall. With this information, the dealer may look at his or her current inventory in order to better determine if any vehicle has an airbag installed in it that is subject to a recall. If so, the dealer is made aware and may take remedial actions such as replacing the recalled airbags with new airbags.

Other types of information may be presented to the dealer. This other information may comprise airbag replacement statistics, recall start and end dates, and the model numbers of each type of airbag installed in each make and model of vehicle. Once the dealer has generated a report using the history report query page (325), the dealer may also be presented with the opportunity to have that report sent to him or her via email by selecting an email report option (330) on the history report query page (325). The dealers previously entered information, in this case the dealer's email address, may be used to send the report to the dealer's email account.

The dealer may further lookup a specific vehicle or airbag in order to determine its status. This may be accomplished by selecting options provided to the dealer under the enter VIN vehicle identification option (310) or the enter airbag identification (315) option. The enter VIN vehicle identification options (310) will now be discussed in connection with FIGS. 4 and 5. As can be seen in FIG. 3, actuation of either a "VIN barcode" button (332), a "VIN photo" button (334), or a "VIN type" button (336) allows a dealer to provide to the system (FIG. 1, 100) with a vehicle identification number (VIN) associated with any particular vehicle. Additionally, FIG. 3 shows an "airbag barcode" button (338), an "airbag photo" button (340), or an "airbag type" button (342) that allows a dealer to provide to the system (FIG. 1, 100) with an airbag identification number (AIN) associated with any particular airbag.

Figure 4:
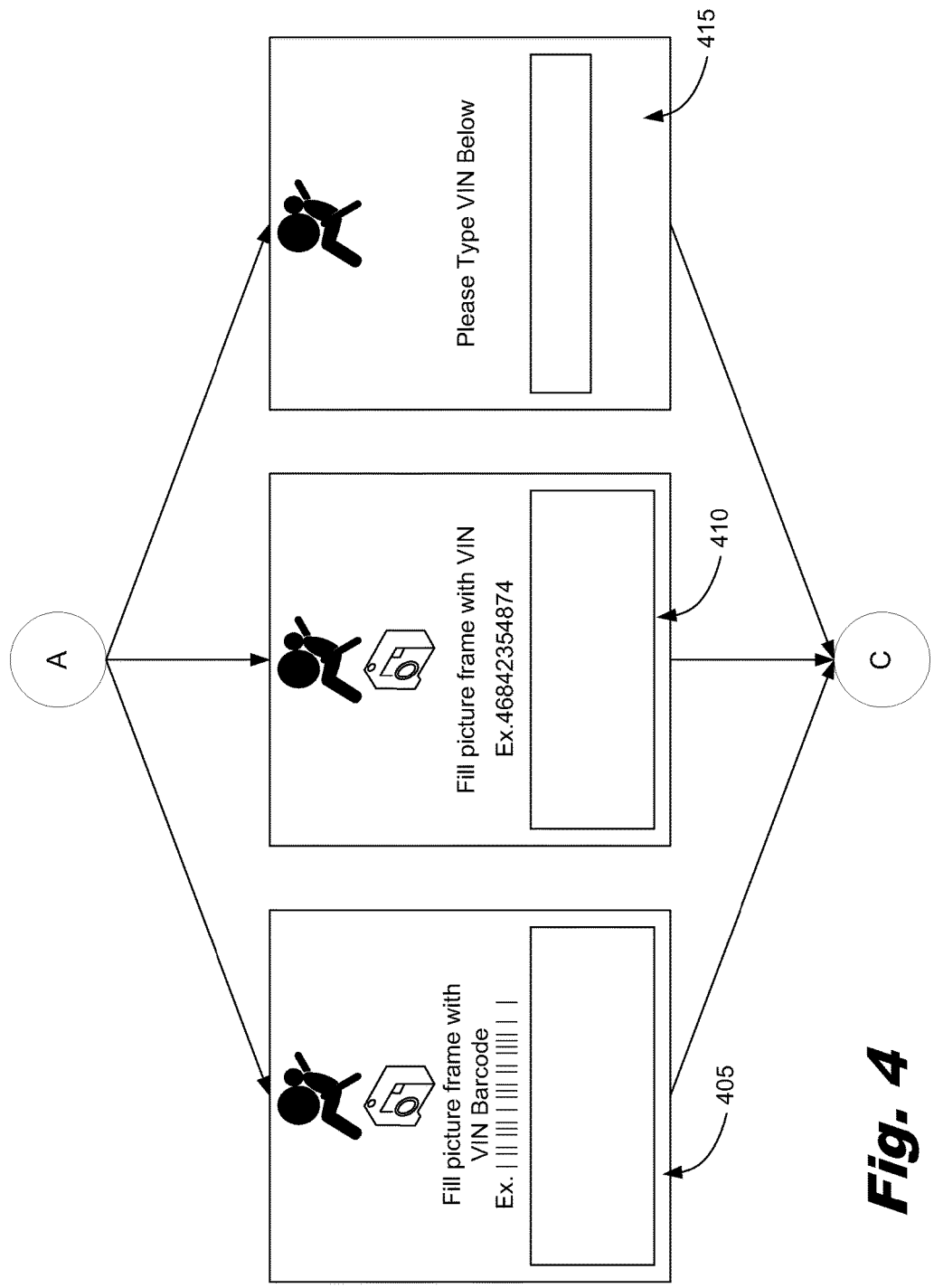

Turning to FIG. 4, a diagram showing the number of graphical dealer interface pages presented to the dealer after the dealer has actuated either the "VIN barcode" button (332), "VIN photo" button (334), or "VIN type" button (336). These pages follow schematically from FIG. 3 via circle "A." Upon actuation of the "VIN barcode" button (332), for example, the dealer is directed to a VIN barcode reader page (405). The VIN barcode reader page (405) allows the dealer to use a captured image or a camera to capture an image of a barcode associated with a VIN. In one example, the dealer may upload an image comprising the barcode to the page. In another example, the system may interface with a digital camera installed on the device used to view the VIN barcode reader page (405) and allow the dealer to, in real time, take a picture of the barcode and upload it to the VIN barcode reader page (405). In yet another example, the system may interface with a digital camera installed on the device used to view the VIN barcode reader page (405) and allow the dealer to augment the camera view by overlaying the page on top of the camera view allowing the user to position the camera view such that a picture may be taken using a interface on the page. This may be done while the user is viewing both the VIN barcode reader page (405) and the barcode in real time creating an augmented reality view for the user. In either of these instances, the device used may be any of the devices (110-1, 110-2, 110-3, 110-4, 110-5) described above in connection with FIG. 1.

Upon actuation of the "VIN photo" button (334), the dealer is directed to a VIN reader page (410). The VIN reader page (410) allows the dealer to use a captured image or a camera to capture an image of a VIN associated with a vehicle. Again, similar to as described above, in one example the dealer may take a previously obtained picture of the VIN and upload that image comprising the VIN to the VIN reader page (410). The system (FIG. 1, 100) may then recognize the numbering and lettering of the VIN, convert the recognized text into digital information and present a new page to the dealer based on that information. In another example, the dealer may be directed to, in real time, take a picture and upload it to the VIN reader page (410). In yet another example, the system (FIG. 1, 100) may interface with a digital camera installed on the device used to view the VIN reader page (410) and allow the dealer to augment the camera view by overlaying the page (410) on top of the camera view allowing the user to position the camera view such that a picture may be taken using a interface on the page (410). This may be done while the user is viewing both the VIN reader page (410) and the VIN in real time creating an augmented reality view for the user. In either of these instances, the device used may be any of the devices (110-1, 110-2, 110-3, 110-4, 110-5) described above in connection with FIG. 1.

Upon actuation of the "VIN type" button (336), the dealer is directed to a VIN type page (415). The VIN type page (415) may allow the dealer to manually enter in the VIN using an input device associated with the device (110-1, 110-2, 110-3, 110-4, 110-5) used to view the VIN type page (415). After entering in the information described above via either the VIN barcode reader page (405), the VIN reader page (410), or the VIN type page (415), the dealer is directed to an installed airbag confirmation page (505). FIG. 4 indicates that, upon entry of this information, the page flow continues by following circle "C" which appears on FIG. 5. The installed airbag confirmation page (505) comprises vehicle information (510) and airbag information (515). The vehicle information (510) comprises the vehicle's make, the vehicle's model, the vehicle's manufacturing year, and the VIN, among other information. The vehicle information (510) may be used by the dealer to confirm that the vehicle in question is the correct type of vehicle. In some examples, a vehicle may have a wrong VIN number associated with it as a result of, for example, previous criminal activities. The installed airbag confirmation page (505) allows the dealer to confirm that the vehicle is the correct vehicle.

In addition to the vehicle information (510), the installed airbag confirmation page (505) also comprises airbag information (515). The airbag information (515) comprises information regarding all of the airbags present in that vehicle. Thus the airbag information (515) may comprise an airbag identification number, the location of where in the vehicle that airbag is installed or description of that airbag, and the current status of the airbag, among other information. The airbag number may be a number associated with that airbag and which is particular to that airbag and no other manufactured airbag comprises an identical number. The airbag location information or airbag description information provides information about the location of the airbag in the vehicle. The airbag status information allows the dealer to determine if any of the airbags are subject to a recall, improperly installed in the vehicle, whether the airbag is an original equipment manufacturer airbag, among others. Particularly to the dealer, the status of the airbag may quickly allow the dealer to determine whether or not all installed airbags in any given vehicle are subject to a recall either from the OEM or from the manufacturer of the vehicle. Because each airbag comprises a unique number and because each airbag is tied to a unique vehicle, entering in the VIN allows the dealer to quickly go through current inventory as well as customer vehicles to determine whether action should be taken with any of the associated airbags.

As briefly described above, the airbag information (515) comprises information regarding the specific airbags associated with a specific vehicle. This information may be compiled at the time of installation. For example, the information may be created first by the OEM. The OEM would make the airbag and assign any given airbag a unique number. As the airbag is shipped, a user implementing the system (FIG. 1, 100) may identify the airbag and determine that the airbag is an OEM airbag and has yet to be installed in a vehicle. In one example, the dealer may be replacing a defective or deployed airbag with a new OEM airbag. To this end, the dealer may select an airbag on the installed airbag confirmation page (505) that is to be replaced. Upon selection of the airbag to be replaced, the dealer may also enter in identifying information regarding the new airbag using a number of airbag identification options (520). The airbag identification options (520) comprise an "airbag barcode" button (525), an "airbag number photo" button (530), or an "airbag number type" button (535). Much like the VIN vehicle identification option (FIG. 3, 310), the selection of either the "airbag barcode" button (525), "airbag number photo" button (530), or the "airbag number type" button (535) will direct the dealer to three different pages.

When the dealer actuates the "airbag barcode" button (525), the dealer may be directed to an airbag barcode reader page (540). The airbag barcode reader page (540) allows the dealer to use a captured image or a camera to capture an image of a barcode associated with an airbag. In one example, the dealer may upload an image comprising the barcode to the page (540). In another example, the system may interface with a digital camera installed on the device used to view the airbag barcode reader page (540) and allow the dealer to, in real time, take a picture of the barcode and upload it to the airbag barcode reader page (540). In yet another example, the system may interface with a digital camera installed on the device used to view the airbag barcode reader page (540) and allow the dealer to augment the camera view by overlaying the page (540) on top of the camera view allowing the dealer to position the camera view such that a picture may be taken using a interface on the page (540). This may be done while the user is viewing both the airbag barcode reader page (540) and the airbag's barcode in real time creating an augmented reality view for the dealer. In either of these instances, the device used may be any of the devices (110-1, 110-2, 110-3, 110-4, 110-5) described above in connection with FIG. 1.

Upon activation of the "airbag number photo" button (530), the dealer may be directed to an airbag number reader page (540). The airbag number reader page (545) allows the dealer to use a captured image or a camera to capture an image of a number associated with an airbag. In one example, the dealer may upload an image comprising the number to the page (545). The system (FIG. 1, 100) may then recognize the numbering and lettering of the airbag number, convert the recognized text into digital information and present a new page to the dealer based on that information.

In another example, the system may interface with a digital camera installed on the device used to view the airbag number reader page (545) and allow the dealer to, in real time, take a picture of the number and upload it to the airbag number reader page (545). Again, the system (FIG. 1, 100) may then recognize the numbering and lettering of the airbag number, convert the recognized text into digital information and present a new page to the dealer based on that information. In yet another example, the system (FIG. 1, 100) may interface with a digital camera installed on the device used to view the airbag number reader page (545) and allow the dealer to augment the camera view by overlaying the page (545) on top of the camera view allowing the dealer to position the camera view such that a picture may be taken using a interface on the page (545). This may be done while the user is viewing both the airbag number reader page (545) and the airbag's number in real time creating an augmented reality view for the dealer. In this example, the system (FIG. 1, 100) may then recognize the numbering and lettering of the airbag's number, convert the recognized text into digital information and present a new page to the dealer based on that information. In either of these instances, the device used may be any of the devices (110-1, 110-2, 110-3, 110-4, 110-5) described above in connection with FIG. 1.

Upon actuation of the airbag number type" button (535), the dealer is directed to an airbag number type page (550). The airbag number type page (550) may allow the dealer to manually enter in the airbag's number using an input device associated with the device (110-1, 110-2, 110-3, 110-4, 110-5) used to view the airbag number type page (550).

The installed airbag confirmation page (505) further comprises a scan new vehicle button (555). Actuation of the scan new vehicle button (555) presents the dealer back at the dealer user page (FIG. 3, 305) where the dealer may enter information regarding another VIN and restart the process as described above.

Figure 5:
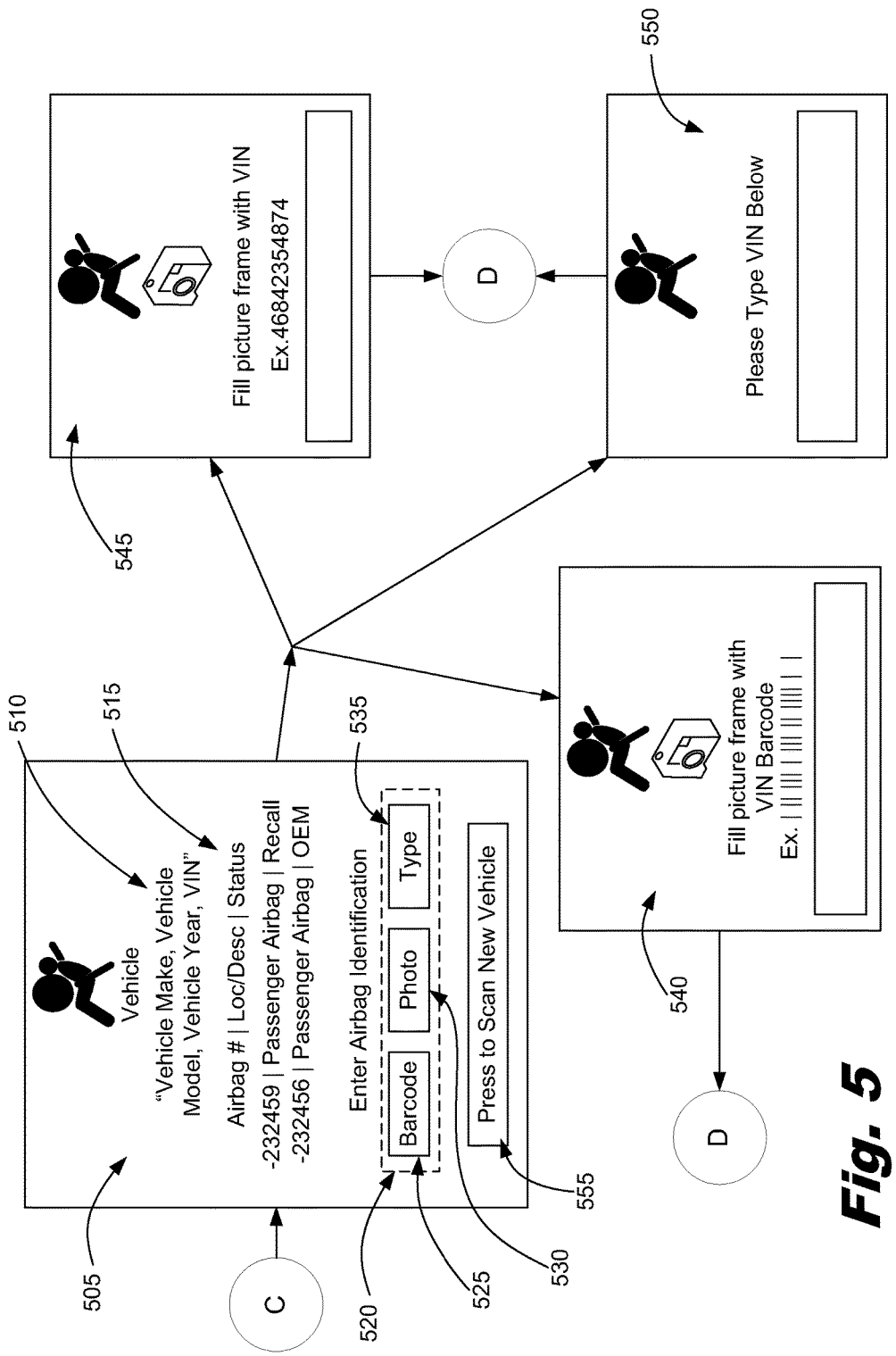

After entering in the information described above via either the airbag barcode reader page (540), the airbag number reader page (545), or the airbag number type page (550), the dealer is directed to a replace airbag confirmation page (605). FIG. 5 indicates that, upon entry of this information, the page flow continues by following circle "D" which also appears on FIG. 6.

The replace airbag confirmation page (605) comprises information regarding the specific airbag to be replaced and the specific airbag replacing that airbag. Again, the airbag being replaced as well as the replacement airbag have unique numbers associated with each and the numbers will be stored by the system (FIG. 1, 100) as an airbag that is being replaced and its replacement airbag. The system (FIG. 1, 100) may store this information in the parts database (FIG. 1, 140) described above. The dealer may confirm the replacement by actuating a confirmation button (610). Additionally, the replace airbag confirmation page (605) comprises a scan new vehicle button (615). Actuation of the scan new vehicle button (615) presents the dealer back at the dealer user page (FIG. 3, 305) where the dealer may enter information regarding another VIN and restart the process as described above.

Upon activation of the confirmation button (610), the dealer is presented with an instructions page (620). The instructions page (620) provides the dealer with further information such as where to send the replaced airbag. In one example, the instructions may indicate that a bag, such as a Tyvek® bag, has been provided with the replacement airbag and that the dealer is to place the replaced airbag in the Tyvek® bag and ship the replaced airbag to the address indicated. Tyvek® is a brand of flashspun high-density polyethylene fibers produced in sheets or bag form and is a registered trademark of Dupont®. The Tyvek® bag may further indicate that postage has been prepaid and that the dealer need not pay to have the replaced airbag shipped.

An advantage to requesting that the dealer send the replaced airbag to a specific location is that the OEM or other entity associated with the use of the airbag may be assured that the airbag that has been replaced will not be reused. For example, where the airbag has deployed, an OEM may want that airbag to be taken out of circulation and not reused. In some instances, the OEM may be financially incentivized to make sure that no dealer, vehicle repairman or other entity uses that airbag in light of the fact that it had already deployed and cannot be used safely in a future accident. In another example, the replaced airbag may not have deployed but may be one of a number of airbags within a vehicle that was subjected to a crash. In this case, at least the OEM and an insurance provider may have a financial incentive to remove all the airbags associated with a vehicle (via the VIN) removed from the vehicle. In this example, the OEM or the insurance provider may be worried that during the crash the airbags should have deployed and because they did not, they may be defective. The OEM may further be financially incentivized to remove all those airbags from circulation and assure that they are destroyed.

Whether or not the Tyvek® bag as described above is used, the system (FIG. 1, 100) may further alert a dealer or other airbag installer that an airbag is not to be installed. In the example where a defective or deployed airbag is attempted to be installed in a vehicle as a bone fide replacement, the system (FIG. 1, 100) may review the history of any specific airbag via the associated airbag number or barcode. This information again is stored in the parts database (140) and may be accessed by a user of the system (FIG. 1, 100). Upon being notified that the airbag is defective in some way or that the airbag should be destroyed instead of used, the installer will refrain from its use. This protects a number of persons and entities involved including, for example, the OEM, the passenger/driver of the vehicle, the vehicle manufacturer, an insurance provider, and a vehicle repairman, among others.

Turning back to FIG. 6, the instructions page (620) may further comprise a next button (630) that, when actuated by the dealer, directs the dealer to a review page (635). The review page (635) indicates that the system (FIG. 1, 100) now recognizes that the airbag has been replaced by an airbag with a specific airbag number and may further indicate the identification information of the airbag that was replaced. The system (FIG. 1, 100) may further indicate to the dealer where in the vehicle the airbag was installed, when it was installed, and update the status of the airbag, among others.

The review page (635) may further comprise a scan new vehicle button (640). Actuation of the scan new vehicle button (640) presents the dealer back at the dealer user page (FIG. 3, 305) where the dealer may enter information regarding another VIN and restart the process as described above.

From the user specific page (FIG. 2, 233) to the review page (FIG. 6, 635) may constitute the pages presented to the dealer as the user of the system (FIG. 1, 100) as the dealer reviews what airbags are present in a vehicle based on the vehicles VIN. The dealer may also look up a specific airbag within a vehicle. Returning back to FIG. 3, FIG. 3 comprises a number of enter airbag identification (315) options, which when actuated by the dealer leads the dealer to a number of pages. As indicated by circle "B," actuation of either the "airbag barcode" button (338), the "airbag number photo" button (340), or the "airbag number type" button (342), the dealer is lead to either an airbag barcode reader page (705), an airbag number reader page (710), or an airbag number type page (715). Much like the airbag barcode reader page (540), an airbag number reader page (545), or an airbag number type page (550) described in FIG. 5, the dealer may enter in appropriate information to view details about that airbag. With the airbag barcode reader page (705), the dealer may use a captured image or use a camera to capture an image of a barcode associated with an airbag and upload that to the page (705). In one example, the dealer may upload an image comprising the airbag barcode to the page (705). In another example, the system (FIG. 1, 100) may interface with a digital camera installed on the device used to view the airbag barcode reader page (705) and allow the dealer to, in real time, take a picture of the barcode and upload it to the airbag barcode reader page (705). In yet another example, the system may interface with a digital camera installed on the device used to view the airbag barcode reader page (705) and allow the dealer to augment the camera view by overlaying the page (705) on top of the camera view allowing the dealer to position the camera view such that a picture may be taken using a interface on the page (705). This may be done while the user is viewing both the airbag barcode reader page (705) and the airbag's barcode in real time creating an augmented reality view for the dealer. In either of these instances, the device used may be any of the devices (110-1, 110-2, 110-3, 110-4, 110-5) described above in connection with FIG. 1.

Upon activation of the "airbag number photo" button (340), the dealer may be directed to an airbag number reader page (710). The airbag number reader page (710) allows the dealer to use a captured image or a camera to capture an image of a number associated with an airbag. In one example, the dealer may upload an image comprising the number to the page (710). The system (FIG. 1, 100) may then recognize the numbering and lettering of the airbag number, convert the recognized text into digital information and present a new page to the dealer based on that information.

In another example, the system may interface with a digital camera installed on the device used to view the airbag number reader page (710) and allow the dealer to, in real time, take a picture of the number and upload it to the airbag number reader page (710). Again, the system (FIG. 1, 100) may then recognize the numbering and lettering of the airbag number, convert the recognized text into digital information and present a new page to the dealer based on that information. In yet another example, the system (FIG. 1, 100) may interface with a digital camera installed on the device used to view the airbag number reader page (710) and allow the dealer to augment the camera view by overlaying the page (710) on top of the camera view allowing the dealer to position the camera view such that a picture may be taken using a interface on the page (710). This may be done while the user is viewing both the airbag number reader page (710) and the airbag's number in real time creating an augmented reality view for the dealer. In this example, the system (FIG. 1, 100) may then recognize the numbering and lettering of the airbag's number, convert the recognized text into digital information and present a new page to the dealer based on that information. In either of these instances, the device used may be any of the devices (110-1, 110-2, 110-3, 110-4, 110-5) described above in connection with FIG. 1.

Upon actuation of the airbag number type" button (342), the dealer is directed to an airbag number type page (715). The airbag number type page (715) may allow the dealer to manually enter in the airbag's number using an input device associated with the device (110-1, 110-2, 110-3, 110-4, 110-5) used to view the airbag number type page (715).

Figure 7:
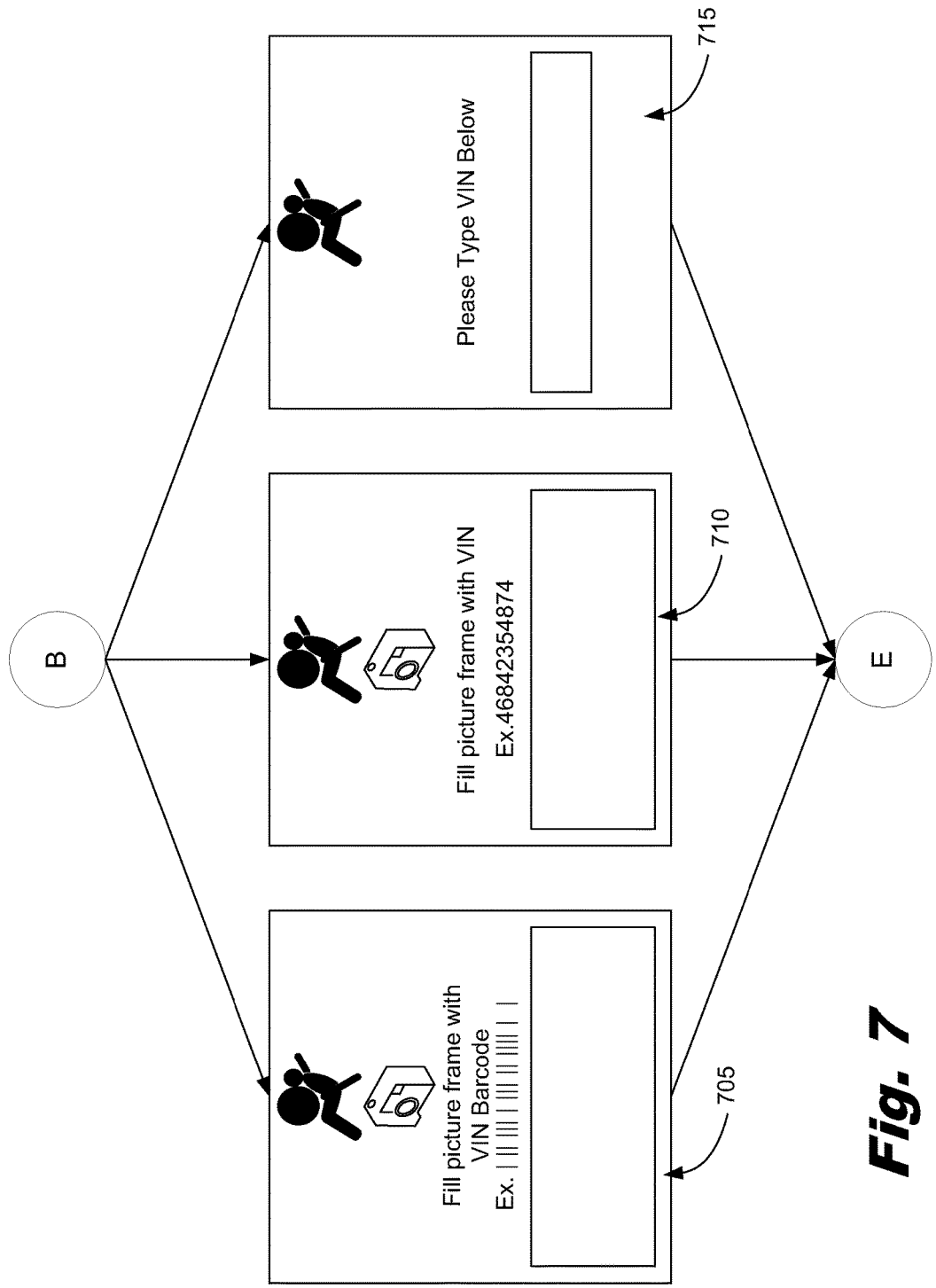

Entry of the information described in connection with any of the three pages (705, 710, 715), leads the dealer to an airbag identification page (805) as indicated by circle "E" found on FIG. 7 and FIG. 8. The airbag identification page (805) comprises vehicle information (810) and airbag information (815). The vehicle information (810) comprises the vehicle's make, the vehicle's model, the vehicle's manufacturing year, and the VIN, among other information. The vehicle information (810) may be used by the dealer to confirm that the vehicle in question is the correct type of vehicle (with matching VIN) that the airbag is associated with.

In addition to the vehicle information (810), the installed airbag confirmation page (805) also comprises airbag information (815). The airbag information (815) comprises information regarding all of the airbags present in that vehicle as well as the information associated with the airbag the dealer had looked up using the airbag barcode reader page (705), the airbag number reader page (710), or the airbag number type page (715) described in connection with FIG. 7.

The installed airbag confirmation page (805) also comprises a scan new vehicle or airbag button (820). Actuation of the scan new vehicle or airbag button (820) presents the dealer back at the dealer user page (FIG. 3, 305) where the dealer may enter information regarding another airbag or VIN and restart the process as described above.

The installed airbag confirmation page (805) also comprises a replace entered airbag button (825) which, when actuated, displays an enter new replacement airbag page (830). The enter new replacement airbag page (830) comprises similar options as those found on the dealer user page (FIG. 3, 305), namely an "airbag barcode" button (835), an "airbag photo" button (840), or an "airbag type" button (845). Actuation of these buttons will direct the dealer to one of the pages described in connection with FIG. 7 namely the airbag barcode reader page (705), the airbag number reader page (710), or the airbag number type page (715) respectively. FIG. 8 indicates this by the circle "B."

Figure 8:
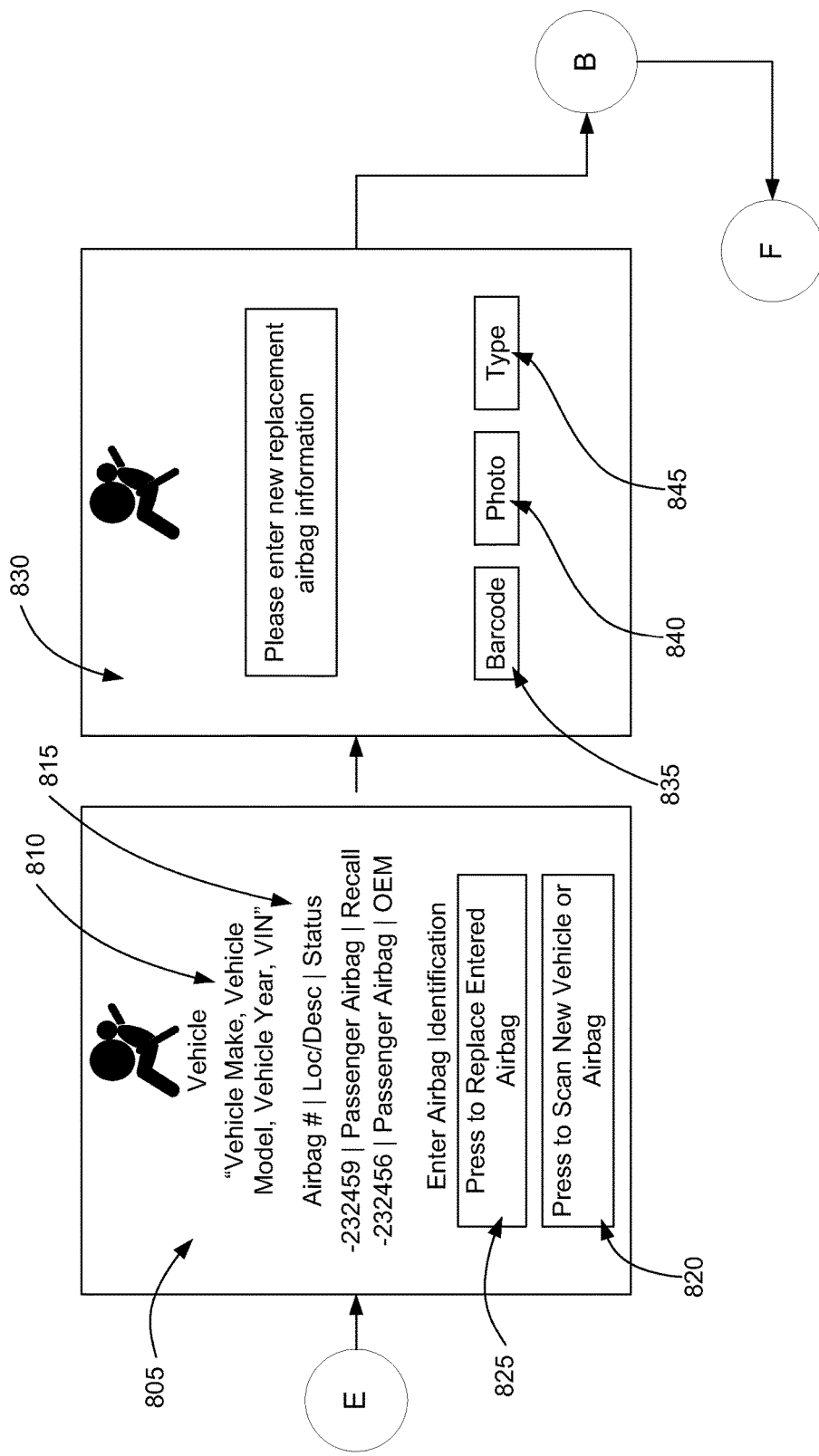
Figure 9:
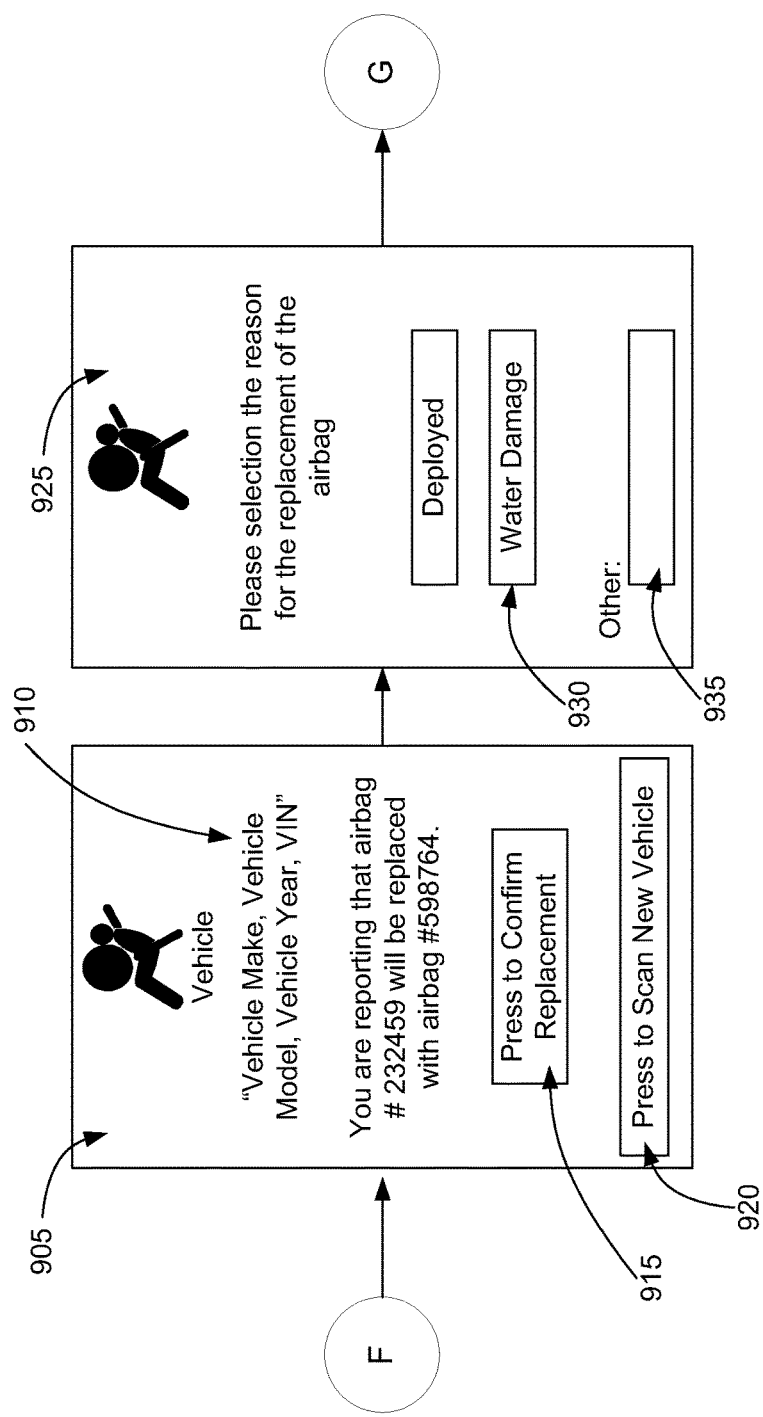

After entering in the information as described above in connection with FIG. 3, the dealer may be directed to a replace airbag and vehicle confirmation page (905) as indicated by circle "F" shown on FIG. 8 and FIG. 9. The replace airbag and vehicle confirmation page (905) comprises vehicle information (910). The vehicle information (910) may be used by the dealer to confirm that the vehicle in question is the correct type of vehicle. In some examples, a vehicle may have a wrong VIN number associated with it as a result of, for example, previous criminal activities. The replace airbag and vehicle confirmation page (905) allows the dealer to confirm that the vehicle is the correct vehicle.

The replace airbag and vehicle confirmation page (905) may further comprise a scan new vehicle or airbag button (920). Actuation of the scan new vehicle or airbag button (920) presents the dealer back at the dealer user page (FIG. 3, 305) where the dealer may enter information regarding another airbag or VIN and restart the process as described above.

The replace airbag and vehicle confirmation page (905) may further comprise a confirmation button (915). Upon activation of the confirmation button (915), the dealer is presented with a reason for replacement page (925). The reason for replacement page (925) requests from the dealer information as to why the airbag is being replaced. The reasons for the replacement of the airbag may be varied including, for example, that the airbag is deployed, the airbag was subjected to water damage, or that the airbag was in a vehicle that was involved in a crash and was not deployed indicative that the airbag is defective. The reason for replacement page (925) may present these reasons to the dealer via a number of push buttons (930) or may request that the dealer manually enter in the reason via a box (935). Either way, upon activation of the push buttons (930) or entry of the information in the box (935), the dealer is presented with the instructions page (FIG. 6, 620) as indicated by circle "G." This directs the dealer to send the replaced airbag to the address provided and view a confirmation page (FIG. 6, 635) as described above. In one example, the instructions page (FIG. 6, 620) may further provide a user with the ability to print out a mailing address. In this example, the instructions page (FIG. 6, 620) may further comprise a print button which, when actuated, sends a print request to a printing device associated with the user computing device (110-1 through 110-5) the user is operating. In one example, the mailing address may be printed on a sticker label such that the user may remove the sticker from its backing and place the address on the Tyvek® bag described above.

The above processes described in connection with FIGS. 3-9 describe the specific set of pages used by a dealer as the user of the system (FIG. 1, 100). In this case, the dealer gained access via the login pages described in connection with FIG. 2 and was directed to his or her specific user page (FIG. 2, 233); namely the dealer user page (FIG. 3, 305). As indicated above, the system (FIG. 1, 100) may be used by a number of different types of users. These different types of users may each be presented with similar pages that allow the user to enter in identification information regarding the vehicle or airbag, review airbag and vehicle information, confirm airbag replacement, view airbag replacement confirmation pages, and view vehicle and airbag history reports. Consequently, the pages detailed in FIGS. 1-9 will be referred to where similar pages are presented to other types of users. Where requested for further clarification, further details will be provided for pages describing the user pages displayed to a type of user.

With referencing FIGS. 1-9, a number of graphical user interface pages presented to a user of the system such as a body shop owner or vehicle repairman will now be described. The repairman may also be presented with the pages presented in FIG. 2. Specifically, the repairman may enter login information into initial login page (205) in order to gain access to the services provided by the system (FIG. 1, 100). The services provided to the repairman may include, at least, all of the service as those described above in connection with the dealer. As a consequence, the repairman may be presented with the same or similar pages presented in FIGS. 2-9. The process may be similar as well. Specifically, the repairman may enter either information regarding the vehicle that is having an airbag replaced or information regarding the airbag to be replaced. The repairman may further be provided with information to confirm the airbags present in the vehicle and the ability to choose which of those airbags are being replaced. Still further, the repairman may be presented with the ability to confirm that an airbag was replaced, receive information on where to ship the replaced airbag (i.e. via the Tyvek® bag), and receive a confirmation page that the airbag and vehicle data has been updated in the parts database (FIG. 1, 140). Still further, the repairman may enter information on a history report query page (FIG. 3, 325) to receive information regarding the airbag history of any single vehicle or type of vehicle.

A repairman may use the system (FIG. 1, 100) to determine what airbags are present any vehicle he or she is servicing. With the knowledge of what airbags are present in the vehicle, the repairman may be able to better determine which airbags are to be replaced in the vehicle after the vehicle has been in a crash. The repairman may be incentivized to use the system (FIG. 1, 100) in order to protect the repairman from any potential litigation that might result in installing a black-market airbag in a vehicle. With the system (FIG. 1, 100) the repairman may determine whether an airbag is an OEM airbag that has never been used or installed in a vehicle before. Additionally, the use of the system (FIG. 1, 100) may also streamline the interaction between the repairman and the insurance company by confirming to the insurance company that the appropriate airbags were installed in the vehicle during the repair of that vehicle. Other advantages may also be realized by the repairman as well including ease of record keeping as well as convenience of having a greater amount of information regarding any vehicle and the airbags associated with that vehicle.

While still referencing FIGS. 1-9, a number of graphical user interface pages presented to a user of the system such as a law enforcement officer will now be described. The law enforcement officer may enter login information into initial login page (205) in order to gain access to the services provided by the system (FIG. 1, 100). The services provided to the law enforcement officer may include, at least, all of the service as those described above in connection with the dealer. As a consequence, the law enforcement officer may be presented with the same or similar pages presented in FIGS. 2-9. The process may be similar as well. Specifically, the law enforcement officer may enter in information regarding the vehicle that comprises an airbag that has been deemed to be stolen or the number of the airbag that appears to be stolen. The law enforcement officer may further be provided with information to confirm the airbags present in the vehicle and the ability to choose which of those airbags are to be declared as stolen. In this example, the replace airbag confirmation page (FIG. 6, 605) described in connection with the dealer and repairman may instead be a stolen airbag confirmation page by which the law enforcement officer may indicate that an airbag in a vehicle is stolen. Still further, the law enforcement officer may be presented with the ability to confirm that an airbag was marked as stole, receive information on where to ship the replaced airbag (i.e. via the Tyvek® bag) if the airbag is found, and receive a confirmation page that the airbag and vehicle data has been updated in the parts database (FIG. 1, 140). Still further, the law enforcement officer may enter information on a history report query page (FIG. 3, 325) to receive information regarding the airbag history of any single vehicle or type of vehicle.

A law enforcement officer may use the system (FIG. 1, 100) to report that any vehicle has an airbag missing or that an airbag has been taken out of a vehicle. For example, upon finding that a vehicle is missing an airbag as the result of an apparent theft, the law enforcement officer may access the system (FIG. 1, 100) in order to match the location of the missing airbag and identify the airbag that should be marked as stolen. In another example, the law enforcement officer may enter in an airbag identification number of an airbag found to determine if the airbag has been marked as stolen or not and whether it should be marked as stolen. This allows any other user to access information about that airbag and be notified that the airbag should not be installed in a vehicle. This prevents any stolen airbag from being a commodity on the black-market. Additionally, the airbags themselves may be better tracked down and destroyed as the law enforcement officer uses the system (FIG. 1, 100). Airbags have chemicals in them which may be harmful to the environment and persons interacting with them. Additionally, some explosives used in the airbags (i.e. sodium azide ($NaN_3$)) may potentially be used by terrorists as an explosive device. Tracking and properly destroying the airbags using the system (FIG. 1, 100) may prevent such an occurrence from happening.

Again, while still referencing FIGS. 1-9, a number of graphical user interface pages presented to a user of the system such as an insurance agent or insurance entity will now be described. The insurance agent may enter login information into initial login page (205) in order to gain access to the services provided by the system (FIG. 1, 100). The services provided to the insurance agent may include, at least, all of the service as those described above in connection with the dealer described above. As a consequence, the insurance agent may be presented with the same or similar pages presented in FIGS. 2-9. The process may be similar as well. Specifically, the insurance agent may enter in information regarding the vehicle that comprises an airbag of interest or the number of the airbag in question. The insurance agent may further be provided with information to confirm the airbags present in the vehicle and the ability to choose which of those airbags are to be declared by the insurance agent as airbags that are defective in some way. In this example, the replace airbag confirmation page (FIG. 6, 605) described in connection with the dealer and repairman may instead be a defective airbag confirmation page by which the insurance agent may indicate that an airbag in a vehicle is defective. The reasons for the airbag being deemed as defective may be varied including, for example, that the airbag is deployed, the airbag was subjected to water damage, or that the airbag was in a vehicle that was involved in a crash and was not deployed indicative that the airbag is functionally defective.

Still further, the insurance agent may be presented with the ability to confirm that an airbag was marked as defective, receive information on where to ship the defective airbag (i.e. via the Tyvek® bag), and receive a confirmation page that the airbag and vehicle data has been updated in the parts database (FIG. 1, 140). Still further, the insurance agent may enter information on a history report query page (FIG. 3, 325) to receive information regarding the airbag history of any single vehicle or type of vehicle.

An insurance agent may use the system (FIG. 1, 100) to report that any airbag within a vehicle is defective. For example, when called to access the damage on a person's vehicle for which the insurance company provides insurance for, the insurance agent may indicate the status of every airbag in the vehicle. Depending on the circumstances, the insurance agent may indicate via the system (FIG. 1, 100) that each airbag is defective and needs to be replaced. In this case, the entry of the VIN or airbag number and the selection of why the airbags are defective will indicate to a repairman of the vehicle, owner of the vehicle, or other user that the airbags should not be used in the vehicle or any other vehicle. This provides protection for the insurance company as well by allowing the insurance company to declare that subsequent use of the airbags, whether in the current vehicle or in a subsequent vehicle, may void any insurance claim presented to the insurance company in the future. In this case, the insurance company may shield itself from any claims from an insured motorist that may arise from the use of the defective airbags. Still further, the owner of the vehicle may be notified that the airbags have been declared by his or her insurance company as defective. This may be done, for example, via an email notification or a phone call to the owner. The owner may then take action to assure that the airbag history of his or her car is updated with replacement (non-defective) airbags being associated with the vehicle. The owner may instruct a repairman to replace the airbags deemed as defective by the insurance agent. The replacement of the airbags may be a condition by which the insured owner of the vehicle receives full or partial insurance coverage on his or her vehicle.

Further to the above example of the insurance agent's use of the system (FIG. 1, 100), the system (FIG. 1, 100) may provide information to any member of the public. As indicated above, a user may be deemed to be a member of the public and be given public user status if he or she is not one of the other types of users described here. As such, the default user specific page (FIG. 2, 233) may be a public user page if other credentials are not provided to indicate otherwise. As mentioned above, a user may be prompted to verify whether he or she is a member of a group other than the public. For example, a law enforcement officer may be requested to enter in a badge number or other identification information as proof that that officer is allowed to access the data on the system (FIG. 1, 100) and alter it. Similar scenarios may exist for an insurance agent, a dealer, an airbag recycler, an airbag packager, an OEM of airbags, or a distributor of airbags. The identification information may be a social security number, a driver's license, or even a user identification created by the system (FIG. 1, 100) after the operator has ascertained that the user is who he or she says they are. This user specific information may be maintained by the system (FIG. 1, 100) in, for example, the parts database (140) which may reserve space for this type of data.

Where a user has been deemed to be a member of the public, FIGS. 2-9 may be an example of a number of graphical user interface pages presented to that public user of the system (FIG. 1, 100). The public user may enter login information into initial login page (205) in order to gain access to the services provided by the system (FIG. 1, 100). The services provided to the public may include, at least, the review of the metadata associated with each airbag in a vehicle. As such, the public user may not be given the ability to change the status of an airbag. In this case, this may prevent an owner of a vehicle from, for example, changing the status of an airbag that was deemed by an insurance agent as defective. As such, the user may be prevented from circumventing the replacement of an airbag that should have been replaced in order for the user to receive full insurance coverage on the vehicle.

In light of the above, the public user may be presented with all the pages presented in FIGS. 2-4 and the installed airbag confirmation page (FIG. 5, 505) merely informing the public user about the installed airbags. The public user may not be given the ability to indicate via the airbag identification options (FIG. 5, 520), for example, which airbags are being replaced or deemed defective. Consequently, the public user may use the system (FIG. 1, 100) as a method to protect them as well as informing the potential purchaser of a vehicle whether the installed airbags are defective or have other problems associated with them. In another example, the user may be provided with the ability to be presented with and emailed a vehicle airbag history report as described in connection with FIG. 3.

Figure 6:
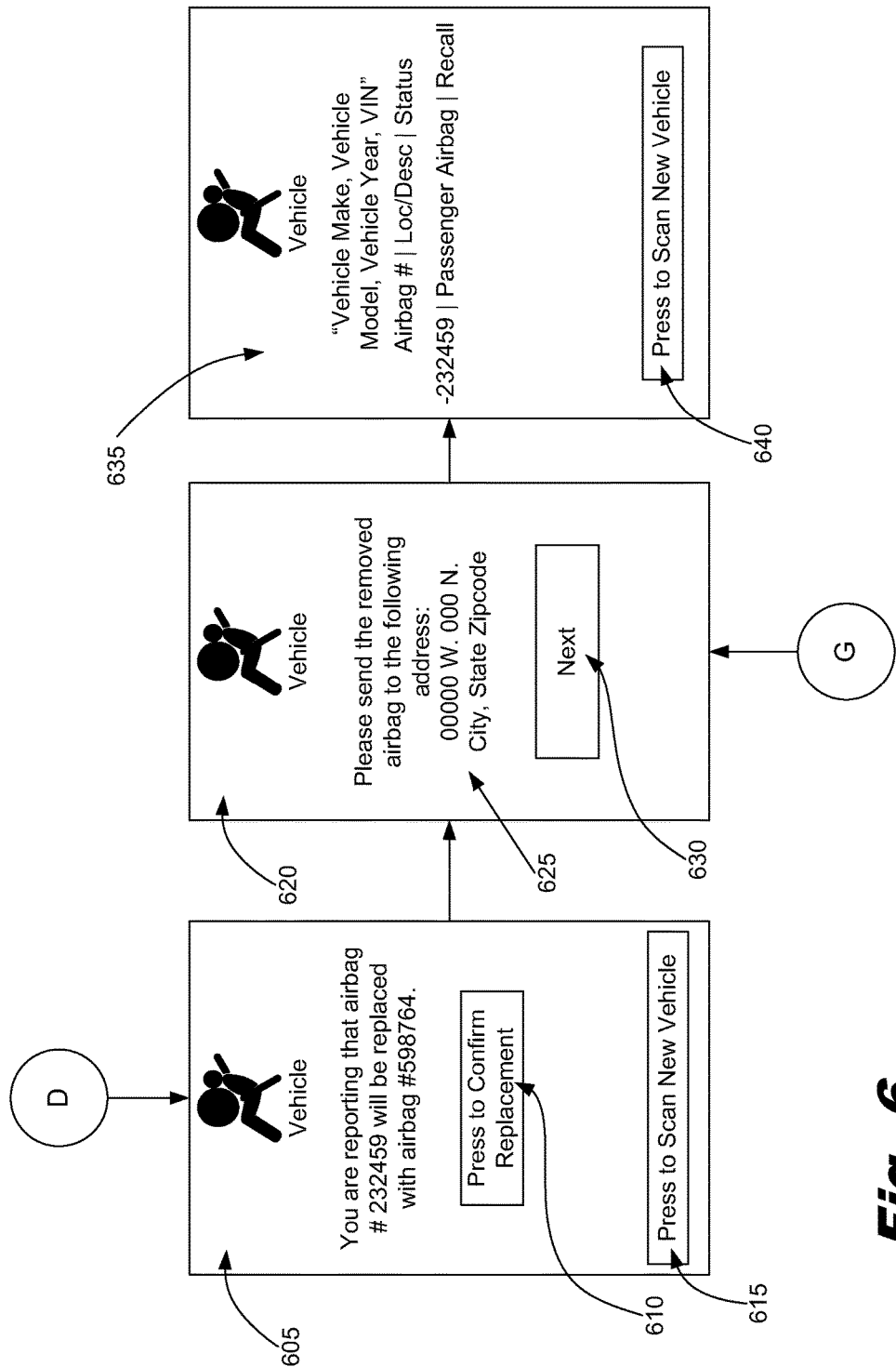

Again, while still referencing FIGS. 1-9, a number of graphical user interface pages presented to a user of the system such as a recycler will now be described. The recycler may be any type of parts or material recycler. In one example, the recycler is a recycler of airbags specifically. In this example, the recycler may also be presented with the pages described in FIG. 2. Specifically, the recycler may enter login information into initial login page (FIG. 2, 205) in order to gain access to the services provided by the system (FIG. 1, 100). The services provided to the recycler may include, at least, all of the service as those described above in connection with the dealer. As a consequence, the recycler may be presented with the same or similar pages presented in FIGS. 2-9. The process may be similar as well. Specifically, the recycler may enter either information regarding the vehicle from which a recycled airbag has been retrieved or information regarding the airbag that has been retrieved. The recycler may further be provided with information to confirm the airbags present in the vehicle and the ability to choose which of those airbags are being recycled or destroyed. The recycler may be the last person in the life of an airbag and may be the owner of the business to where other users may send the used, defective, or replaced airbags to as described in connection with the instructions page (FIG. 6, 620). Specifically, other users may send the airbags in the Tyvek® bags to the recycler where the recycler can scan the airbag information and mark the airbag as destroyed before placing the airbag in an incinerator or other disposal system. Consequently, each airbag may be traced from the original equipment manufacturer (OEM) to the recycler with a number of other users (i.e. law enforcement officer, insurance agent, repairman) also altering the data associated with the airbag as the airbag travels through commerce.

Still further, the recycler may be presented with a confirmation page that the airbag data has been updated in the parts database (FIG. 1, 140). Still further, the recycler may also enter information on a history report query page (FIG. 3, 325) to receive information regarding the airbag history of any single vehicle or type of vehicle.

A recycler may use the system (FIG. 1, 100) in order to indicate on the system which airbags were received by the recycler and which airbags have been destroyed. In one example, the recycler may be provided with monetary compensation to perform the task of destroying the airbag and so indicating on the system (FIG. 1, 100).

An airbag packager may also use the system (FIG. 1, 100) as described above. With referencing FIGS. 1-9, the airbag packager may also be presented with the pages presented in FIG. 2. Specifically, the airbag packager may enter login information into initial login page (205) in order to gain access to the services provided by the system (FIG. 1, 100). The services provided to the airbag packager may include, at least, all of the service as those described above in connection with the dealer. As a consequence, the airbag packager may be presented with the same or similar pages presented in FIGS. 2-9. The process may be similar as well. Specifically, the airbag packager may enter information regarding the airbag that is being packaged. This allows one additional status to be placed in the airbag confirmation page (FIG. 5, 505) by the airbag packager before installation of the airbag in a vehicle. A repairman or vehicle manufacturer, using the system (FIG. 1, 100), may then change the status from "packaged" to "installed" when they place the received airbag in a vehicle. In one example, the packager may also be the OEM or a parts provider who had received the packaged airbag from the OEM. In either case, a recipient of the packaged airbag, once he or she provides the system (FIG. 1, 100) with the airbag identification, may know that the airbag had yet to be used and can be assured that the received airbag is not a black-market airbag. In one example, the airbag packager may be presented with an airbag packaged confirmation page instead of the replace airbag confirmation page (FIG. 6, 605) as described above. Because the airbag packager is not associating the airbag with a vehicle, the status is automatically updated as "packaged." The airbag packager may then shown a confirmation page such as the review page (FIG. 6, 635) and then be directed to scan another airbag for packaging.

With referencing FIGS. 1-9, a number of graphical user interface pages presented to a user of the system such as original equipment manufacturer (OEM) will now be described. The OEM may also be presented with the pages presented in FIG. 2. Specifically, the OEM may enter login information into initial login page (FIG. 2, 205) in order to gain access to the services provided by the system (FIG. 1, 100). The services provided to the OEM may include, at least, all of the service as those described above in connection with the dealer. As a consequence, the OEM may be presented with the same or similar pages presented in FIGS. 2-9. The process may be similar as well. Specifically, the OEM may enter either information regarding the vehicle that is having an airbag recalled or information regarding the airbag to be recalled. The OEM may further be provided with information to confirm the airbags present in a vehicle and the ability to choose which of those airbags are being recalled. Still further, the OEM may be presented with the ability to confirm that an airbag was marked as recalled and receive a confirmation page that the airbag and vehicle data has been updated in the parts database (FIG. 1, 140). Still further, the OEM may enter information on a history report query page (FIG. 3, 325) to receive information regarding the airbag history of any single vehicle or type of vehicle.

An OEM may use the system (FIG. 1, 100) to send out a recall notice to all owners, dealers, and repairers of vehicles associated with the recalled airbags. In this example, the system (FIG. 1, 100) may provide the OEM with the ability to contact, at least, the dealer who is selling or who has sold the vehicle. The dealer may then be directed to contact the owner so that the owner may come in to have the airbag replaced as described above. Still further, the system may allow the OEM to ship a replacement airbag to that dealer for them to replace the recalled airbag with. All of the email information, VIN information, address information, and contact information of the owner of the vehicle may also be stored in a portion of the parts database (140) reserved for such information. The OEM may also be able to determine which airbags that were subjected to the recall have or have not been replaced providing the OEM with specifics as to the effectiveness of the recall. This may allow the OEM to take further measure to assure that those recalled airbags are not present in any vehicle. Still further, a report may be presented to the OEM for compliance with any government requirements such as recall compliance.

The OEM may be incentivized to use the system (FIG. 1, 100) in order to protect the OEM and it customers from any potential harm or litigation that might result from the use of the recalled airbags. Additionally, the use of the system (FIG. 1, 100) may also streamline the interaction between the OEM and its customers by confirming to the OEM and the customer that the appropriate airbags were recalled and replaced with new airbags. Other advantages may also be realized by the OEM including ease of record keeping and convenience of having a greater amount of information regarding any vehicle and the airbags associated with those vehicles.

With referencing FIGS. 1-9, a number of graphical user interface pages presented to a user of the system such as a supplier of original equipment from the original equipment manufacturer (OEM) will now be described. The supplier may also be presented with the pages presented in FIG. 2. Specifically, the supplier may enter login information into initial login page (FIG. 2, 205) in order to gain access to the services provided by the system (FIG. 1, 100). The services provided to the supplier may include, at least, all of the service as those described above in connection with the packager. As a consequence, the supplier may be presented with the same or similar pages presented in FIGS. 2-9. The process may be similar as well. Specifically, the supplier may enter information regarding the airbag that is packaged. This allows one additional status to be placed in the airbag confirmation page (FIG. 5, 505) by the supplier before installation of the airbag in a vehicle. A repairman or vehicle manufacturer, using the system (FIG. 1, 100), may then change the status from "packaged" to "installed" when they place the received airbag in a vehicle. In this example, a recipient of the packaged airbag from the supplier, once he or she provides the system (FIG. 1, 100) with the airbag identification, may know that the airbag had yet to be used and can be assured that the received airbag is not a black-market airbag. In one example, the supplier may be presented with an airbag packaged confirmation page instead of the replace airbag confirmation page (FIG. 6, 605) as described above. Because the supplier is not associating the airbag with a vehicle, the status is automatically updated as "packaged." In another example, a new status may be entered indicating that the airbag is both packaged and shipped. The supplier may then be shown a confirmation page such as the review page (FIG. 6, 635) and then be directed to scan another airbag for shipping.

Turning now to FIG. 11, a diagram showing an account details page presented to a user of the system according to one example of the principles described herein is shown. The accounts detail page (1105) provides a user of the system with details regarding his or her service account. The system (FIG. 1, 100) may be provided to a user as a cost of the service. In one example, the service provided may be as a daily, weekly, monthly or yearly subscription. In this example, the user may access the system (FIG. 1, 100) and its associated data at any time and without restrictions. In exchange, the user pays money for the subscription period. In another example, the services provided by the system (FIG. 1, 100) may be provided on a click-by-click basis. In this example, the user may be charged or paid each time a button is actuated on the pages described below and in connection with FIGS. 2-9 and 11. Alternatively, a user may be charged each time data from the parts database (140) is accessed and provided to the user. In this example, the user is charged for an amount of data accessed.

In order to allow for user flexibility, the accounts detail page (1105) may comprise a change subscription button (1110). The user may actuate this button in order to change from a click-by-click subscription to a term subscription or visa-versa as described above. In another example, a payout or commission may be presented to those persons or entities who report defective bags and/or return those defective bags to the manufacturer or the proper disposal site. In this example, such a user may be allowed access to the system (100) for free and paid by any interested party to seek out and find those airbags that are defective and report them using a device connected to the system (100). In these examples described above, a user may be presented with cost advantages as well that described his or her previous system (FIG. 1, 100) usage data as well as a cost/benefit analysis as to whether a change in the user's subscription is advised in light of that usage data.

The accounts detail page (1105) may further comprise a balance statements button (1115). Actuation of the balance statements button allows a user to access data associated with payments made by the user for user of the system (FIG. 1, 100). Specifically, the user may be allowed to access past payments, review current balance owed to the operator of the system (FIG. 1, 100) and dates on which the payment is due. Here the user may further be provided to preemptively pay an amount of money in anticipation for use of the system (FIG. 1, 100). Still further, the user may set up the system (FIG. 1, 100) to automatically withdrawal or charge an account so that service will not lapse between payments. To do so, the user may provide secure information to the system (FIG. 1, 100) which gives authorization to access a money or credit account.

If the user was on a click-by-click subscription as described above, the user may further be provided details about access to the system (FIG. 1, 100) after actuation of the balance statements button (1115). In this case, the user may review all activity on his or her account on a day by day basis as well as be provided the option to print out the details of the services accessed on the system (FIG. 1, 100).

The accounts detail page (1105) may further direct the user to the change password page (219) or to an edit account details page. Each of these pages further allows the user to change settings on his or her account in order to provide up-to-date details about the user. In one example, the user may deliberately access the change password page (219) in an attempt to prevent another authorized user from accessing the system (FIG. 1, 100). In another example, the user may access an edit account details page in order to update an email address, a physical address, a phone number, a credit card number, and n account type, among others.

Figure 10:
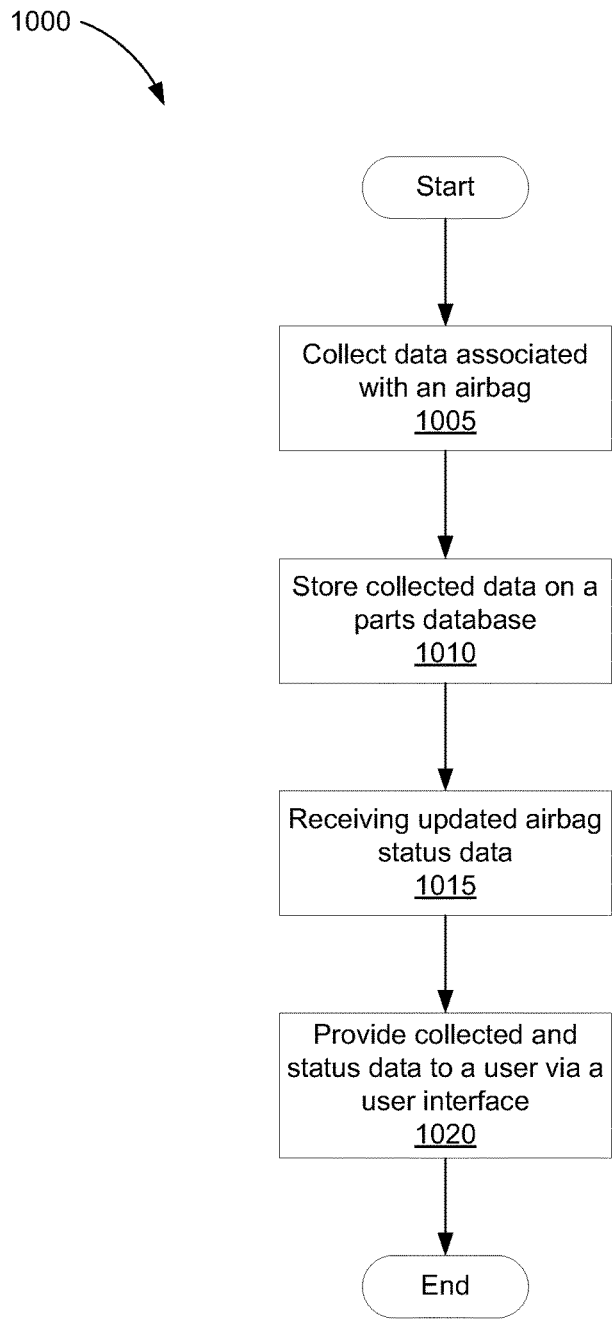
FIG. 10 is a flowchart showing a method of tracking an airbag according to one example of principles described herein.

FIG. 10 is a flowchart showing a method (1000) of tracking an airbag according to one example of principles described herein. The method (1000) may begin with collecting (1005) data associated with a specific airbag. As described above, this data may include the family of airbags the particular airbag belongs to, the vehicle the airbag is installed on, the manufacturing date of the airbag, the barcode associated with the number, the serial number associated with the airbag, the manufacturer of the airbag, the manufacturing date of the airbag, and the destruction date of the airbag, among others. This data may comprise any data descriptive data from when it was manufactured to when it was destroyed between those two periods.

The method (1000) may further comprise storing (1010) the collected data on a parts database (FIG. 1, 140). The parts database may comprise the collected data that, along with some data associated with the airbag, also comprises data associated with each user of the system (FIG. 1, 100). For example, the stored data may further comprise the name of the user, user login information, history information associated with the user's use of the system (FIG. 1, 100), user vehicle VIN, user address, user phone number, and other identifying information associated with the user and the user's activities on the system (FIG. 1, 100).

The method (1000) may further comprise receiving (1015) updated airbag status data. The updated airbag status data comprises those changes made by the users as to the status of the airbag as described above. Specifically, the updated airbag status data may comprise an update from a "manufactured" status to a "packaged" status; a "packaged" status to a "delivered" status; a "delivered" status to an "installed" status; an "installed" status to a "damaged" status; an "installed" status to a "deployed" status; a "damaged" status to a "destroyed" status; a "deployed" status to a "destroyed" status; or combinations thereof. The updating of the status by each user allows a subsequent user of the system (FIG. 1, 100) to know at what point in the lifecycle of the airbag that particular airbag is in.

The method (1000) may further comprise providing (1020) the collected data and status data to a user of the system (FIG. 1, 100) via the user interface such as the user device interface (FIG. 1, 145-1, 145-2, 145-3, 145-4, 145-5). The user device may provide each user with a set of user interface pages based on the type of user that user is. As described above, some users may be more functionally limited than some other users implementing the system (FIG. 1, 100). For example, some users may be allowed to change the status data associated with an airbag while others may not be allowed. In one example, the extent of the functionality of the system (FIG. 1, 100) may be dependent on whether the user provided the system with qualifying information that allows the user to access and change data on the system. In another example, the extent of the functionality of the system (FIG. 1, 100) may be dependent on the level of services paid for by the user.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computer (110-1 through 110-5) or other programmable data processing apparatus, implement the functions or acts specified in the flowchart and/or block diagram block or blocks. In one example, the computer usable program code may be embodied within a computer readable storage medium; the computer readable storage medium being part of the computer program product.

The computer readable storage medium may comprise computer usable program code to, when executed by a processor, collects data associated with a specific airbag. The computer readable storage medium may further comprise computer usable program code to, when executed by a processor, store the collected data on a parts database, receive updated airbag status data, and provide the collected data and status data to a user of the system (FIG. 1, 100). The computer usable program code may, in one example, further provide a graphical user interface such that a user may interact with, for example, a webpage in order to interact with the system and the pages described in FIGS. 2-9. In one example, the server (FIG. 1, 105) may provide the computer usable program code to each of the number of user devices (110-1 through 110-5) such that each number of user devices (110-1 through 110-5) is presented with the pages described herein.

The specification and figures describe a system and method for tracking an airbag. The system (FIG. 1, 100) may provide a number of types of users with the ability to track the status of an airbag as the airbag is moved from manufacturing to destruction. As the lifecycle of the airbag proceeds from the manufacturing, it is helpful to track the airbag via VIN or airbag number in order to determine if that airbag is safe for further consumption on the market. The system further provides a method and system to quickly and efficiently institute a recall process associated with a number of airbags. Still further the present system and method allows a number of different types of user to determine when an airbag should be destroyed. Still further, due to the environmental and physical dangers associated with the chemicals used in an airbag, the present system further provides for the appropriate disposal and monitoring of any airbag that has been manufactured.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system of tracking an airbag, comprising:
   a server;
   a parts database communicatively coupled to the server; and
   a number of user devices communicatively coupled to the server;
   in which the server collects data associated with the airbag, the data associated with the airbag describing a family of airbags the airbag belongs to as a member, and
   providing alerts to a status of the airbag to the server based on statuses of each of the family member airbags, wherein the alerts are provided when at least one of the user devices scans an identification of a family member airbag alerting a user of the airbag that the status of the airbag has changed because the status of a family member airbag has changed; and
   in which the server receives and automatically updates status data associated with the family of airbags in the parts database when the status of the family member airbag is updated from the at least one of user devices.

2. The system of claim 1, in which the parts database stores the collected data and in which the collected data comprises data associated with a user of the system and data associated with the airbag.

3. The system of claim 2, in which the data associated with a user of the system comprises the name of the user, user login information, history information associated with the user's use of the system, user vehicle VIN, user address, user phone number, or combinations thereof.

4. The system of claim 1, in which the data associated with the airbag comprises the vehicle the airbag is installed in, the manufacturing date of the airbag, the barcode associated with the airbag, the serial number associated with the airbag, the manufacturer of the airbag, the manufacturing date of the airbag, the destruction date of the airbag, or combinations thereof.

5. The system of claim 1, in which the system provides the collected data and the status data to a user of the system on a number of pages in a graphical user interface associated with one of the user devices.

6. The system of claim 5, in which the system receives from a number of users updated status data via the graphical user interface.

7. The system of claim 6, in which the updated status data comprises a "packaged" status, a "delivered" status, an "installed" status, a "damaged" status, a "deployed" status, or a "destroyed" status.

8. The system of claim 6, in which the ability of the user to update the status data is dependent upon a type of user the system has associated the user as.

9. The system of claim 8, in which the type of user may comprise a car dealer, a repairman, a law enforcement officer, an insurance agent, a recycler, a member of the public, a packager of the airbag, an original equipment manufacturer (OEM), or a distributor of the OEM's airbag.

10. The system of claim 8, in which the system requests confirming information as to the type of user the system is to associate the user as.

11. A method of tracking an airbag via the system of claim 1, comprising:
   collecting data associated with a specific airbag;
   storing the collected data on a parts database;
   receiving updated airbag status data; and
   providing the collected data and status data to a user.

12. The method of claim 11, in which the collected data associated with the airbag comprises data describing a vehicle into which the airbag is installed.

13. The method of claim 12, in which the collected data associated with the airbag comprises data associating the airbag with other airbags installed in the vehicle.

14. The method of claim 11, in which the parts database stores the collected data and in which the collected data comprises and in which the data associated with a user of the system comprises the name of the user, user login information, history information associated with the user's use of the system, user vehicle VIN, user address, user phone number, or combinations thereof.

15. The method of claim 11, in which providing the collected data and status data to a user comprises providing the collected data and the status data to a user via a number of pages in a graphical user interface associated with a user device.

16. The method of claim 11, in which receiving updated airbag status data comprises receiving a number of users updated status data via the graphical user interface of a user computing device.

17. The method of claim 16, in which the ability of the user to update the status data is dependent upon a type of user the system has associated the user as.

18. A computer program product for tracking an airbag operating on the server of claim 1, the computer program product comprising:
a computer readable storage medium comprising computer usable program code embodied therewith, the computer usable program code comprising:
computer usable program code to, when executed by a processor, collect the data associated with a specific airbag;
computer usable program code to, when executed by a processor, store the collected data on a parts database;
computer usable program code to, when executed by a processor, receive the updated airbag status data; and
computer usable program code to, when executed by a processor, provide the collected data and status data to a user.

19. The computer program product of claim 18, further comprising computer usable program code to, when executed by a processor, provide the collected data and the status data to a user via a number of pages in a graphical user interface associated with a user device.

20. The computer program product of claim 18, further comprising computer usable program code to, when executed by a processor, receive a number of users updated status data via the graphical user interface of a user computing device.

21. A system of tracking an airbag, comprising:
a server;
a parts database communicatively coupled to the server; and
a number of user devices communicatively coupled to the server;
in which the server collects data associated with the airbag, the data associated with the airbag originating from one of the number of user devices after a scan of an identification of the airbag and describing a destruction date of the airbag; wherein the collected data further comprises data describing a number of familiarly related airbags the airbag is associated with; and
in which the server receives and automatically updates status data associated with the airbag in the parts database when the data associated with the airbag is collected; and
in which each of a status of each of the number of familiarly related airbags is updated automatically by the server when it has been determined by the server that the updated status of the airbag detrimentally effects the status of each of the number of familiarly related airbags; an alert of the status change to each of the number of familiarly related airbags being sent out from the server.

22. A system of tracking an airbag, comprising:
a server;
a parts database communicatively coupled to the server; and
a number of user devices communicatively coupled to the server;
in which the server collects data associated with a family of airbags of which the airbag is a member; and
in which the server receives and updates, in the parts database, status data associated with the airbag from a user using a first of the number of user devices based on a status change of any one of the other airbags of the family of airbags, the ability of the user to update the status data being dependent upon a type of user associated to the user by the system; and
in which the server broadcasts an alert regarding each of the other airbags in the family of airbags to any one of the number of user devices indicating the status of the airbag and, consequently, the status of the other airbags of the family of airbags has been changed.

* * * * *